US007433460B2

(12) United States Patent
Budka et al.

(10) Patent No.: US 7,433,460 B2
(45) Date of Patent: Oct. 7, 2008

(54) METHODS OF CONTROLLING LINK QUALITY AND TRANSMIT POWER IN COMMUNICATION NETWORKS

(75) Inventors: Kenneth C. Budka, Marlboro, NJ (US); Arnab Das, Washington, DC (US); Kamala Murti, Morganville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1104 days.

(21) Appl. No.: 10/425,602

(22) Filed: Apr. 30, 2003

(65) Prior Publication Data

US 2004/0218567 A1 Nov. 4, 2004

(51) Int. Cl.
*H04Q 7/00* (2006.01)

(52) U.S. Cl. .................. 379/332; 370/392; 370/437; 370/252; 370/318; 455/450; 455/452.1; 455/452.2

(58) Field of Classification Search .................. 370/392, 370/332, 437, 252, 278, 318; 455/452.1, 455/450, 452.2
See application file for complete search history.

(56) References Cited

U.S. PATENT DOCUMENTS

| | | | |
|---|---|---|---|
| 6,208,663 B1* | 3/2001 | Schramm et al. ............. 370/465 |
| 6,308,082 B1* | 10/2001 | Kronestedt et al. ........ 455/67.11 |
| 6,434,130 B1* | 8/2002 | Soininen et al. ............. 370/331 |
| 6,516,196 B1* | 2/2003 | Chen et al. ................... 455/450 |
| 6,678,531 B1* | 1/2004 | Salonaho .................... 455/522 |
| 6,865,233 B1* | 3/2005 | Eriksson et al. ............. 375/261 |
| 6,937,582 B1* | 8/2005 | Kronestedt ................... 370/329 |
| 6,947,490 B1* | 9/2005 | Edwards et al. ............. 375/261 |
| 7,027,420 B2* | 4/2006 | Hamalainen ................ 370/335 |
| 7,050,824 B2* | 5/2006 | Masseroni et al. .......... 455/522 |
| 7,120,199 B2* | 10/2006 | Thielecke et al. ........... 375/267 |
| 7,151,740 B2* | 12/2006 | Zhang et al. ................ 370/208 |
| 7,184,417 B2* | 2/2007 | Proctor, Jr. .................. 370/329 |
| 7,206,332 B2* | 4/2007 | Kwan et al. ................. 375/140 |
| 2002/0183010 A1* | 12/2002 | Catreux et al. ............. 455/67.1 |
| 2003/0043778 A1* | 3/2003 | Luschi et al. ............... 370/349 |
| 2004/0081248 A1* | 4/2004 | Parolari ....................... 375/259 |
| 2004/0092262 A1* | 5/2004 | Voyer et al. .............. 455/435.2 |
| 2004/0198294 A1* | 10/2004 | Hagin-Metzer ............. 455/296 |
| 2007/0149134 A1* | 6/2007 | Sebire et al. ............. 455/67.11 |

* cited by examiner

*Primary Examiner*—Edan Orgad
*Assistant Examiner*—Andrew C Lee

(57) ABSTRACT

A method of controlling link transmission parameters of a communication flow in a network caches one or more network parameters at the end of a first communication flow for an elapsed time, and adjusts the network parameters for controlling link quality and transmit power of a next communication flow based on an uncertainty that is caused by caching for the elapsed time. The state of a communication channel during a previous communication flow (connection) is used to determine network parameters to use at a future communication flow. When a connection begins, and the network does not know the ideal settings to use, the network defines a specified, elapsed time duration over which the state of a previous connection no longer can be trusted, i.e., an uncertainty period. Network parameters are adjusted to account for uncertainty caused by the elapsed time.

19 Claims, 14 Drawing Sheets

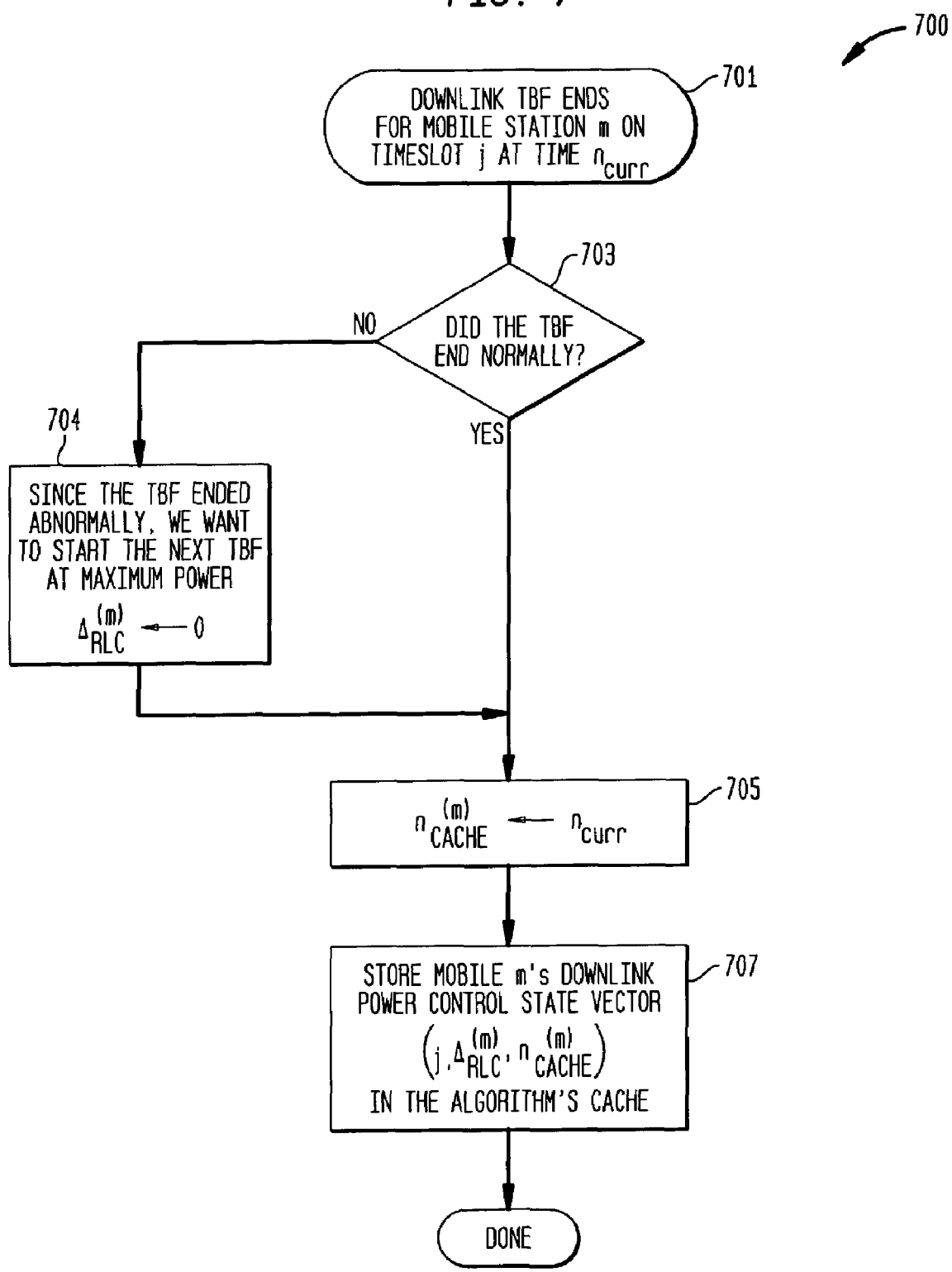

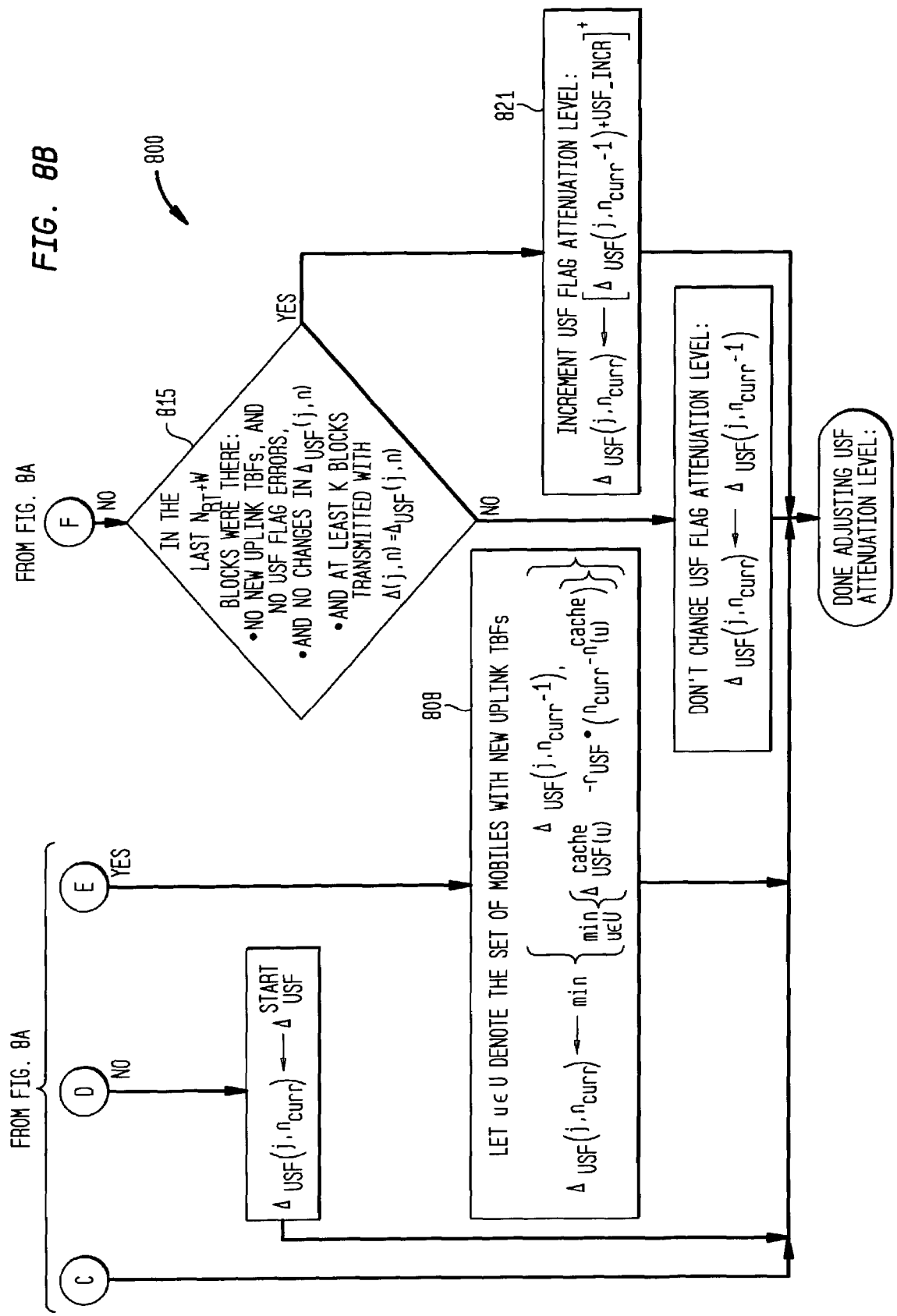

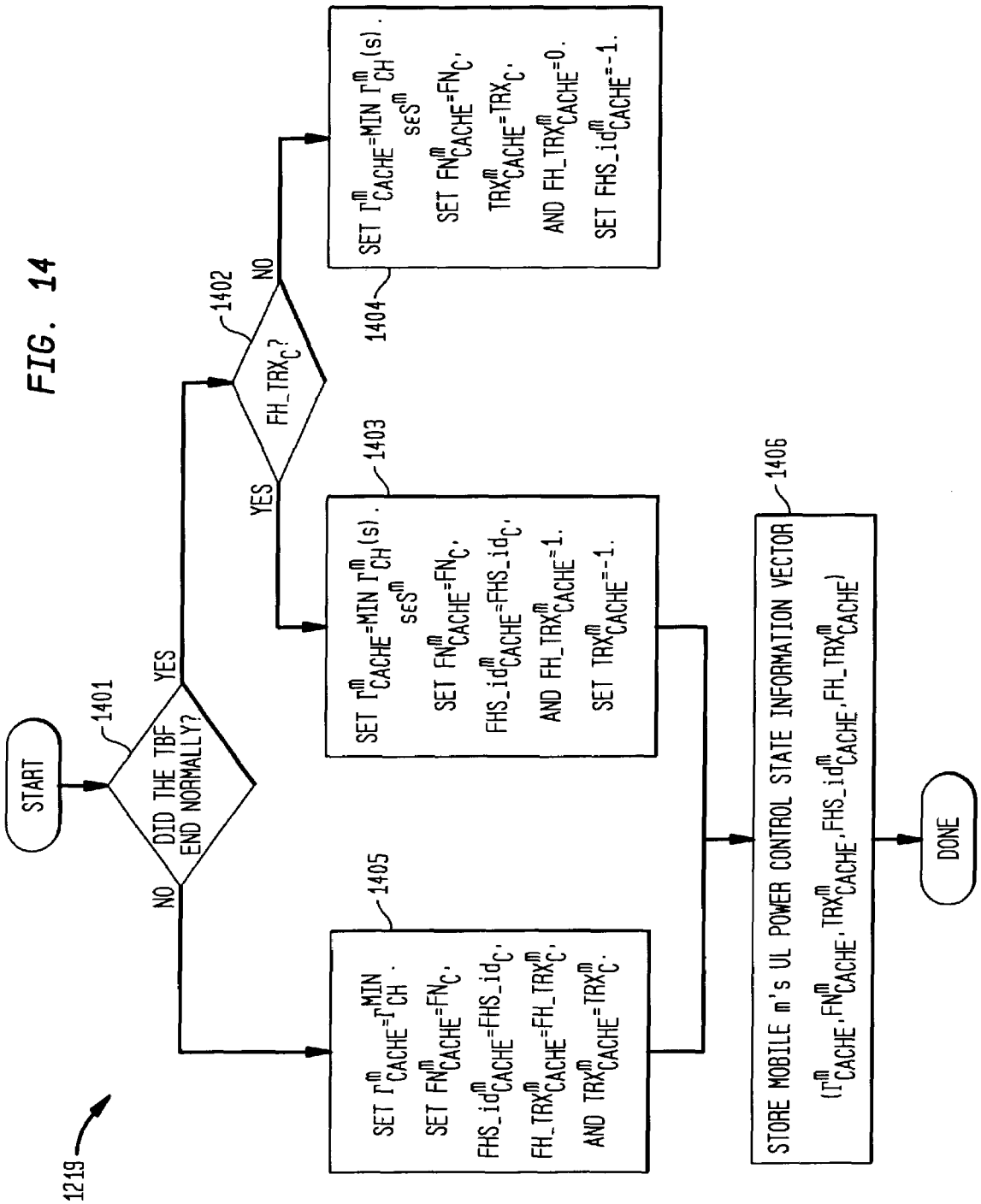

METHODS OF CONTROLLING LINK QUALITY AND TRANSMIT POWER IN COMMUNICATION NETWORKS

CONTINUATION INFORMATION

This application claims domestic priority benefits under 35 U.S.C. §120 to the following co-pending U.S. patent applications: U.S. application Ser. No. 09/610,097 to BUDKA et al., filed Jun. 30, 2000 and entitled "Downlink Power Control Method for Wireless Packet Data Network"; U.S. application Ser. No. 09/989,335 to BUDKA et al., filed Nov. 20, 2001 and entitled "Uplink Power Control Algorithm"; U.S. application Ser. No. 10/123,131 to BUDKA et al., filed Apr. 17, 2002 and entitled "Uplink Power Control Algorithm"; U.S. application Ser. No. 10/124,298 to BUDKA et al., filed Apr. 18, 2002 and entitled "Link Adaptation in General Packet Radio Service Networks"; and U.S. application Ser. No. 10/133,385 to BUDKA et al., filed Apr. 29, 2002 and entitled "Link Adaptation in Enhanced General Packet Radio Service Networks". The contents of each of the above co-pending applications are incorporated by reference in their entirety herein.

BACKGROUND OF THE INVENTION

1. Field of the Invention

The present invention relates to methods of controlling link quality and transmit power used for transmissions between a base station and one or more mobile stations of a network such as a general packet radio service (GPRS) network or enhanced general packet radio service (EGPRS) network.

2. Description of Related Art

In cellular systems, a network of base transceiver stations (BTS) is used to provide wireless links with mobile stations. The mobile stations, sometimes referred to as mobiles, typically communicate via analog or digital modulated radio frequency (RF) signals with the base station, which is itself connected to an external network.

A variety of digital cellular networks and telecommunications standards are in use today, such as GSM (Global System for Mobile Communication), and GSM derivatives (e.g., DCS 1800, PCS 1900, etc.). GPRS (General Packet Radio Service) is a standard that adds general Internet Protocol (IP) data communication, such as high-speed Internet and email data services, to GSM networks. GPRS uses a packet-mode technique to transfer high-speed and low-speed data and signaling in an efficient manner over GSM radio networks. The packet radio principle of GPRS can be used for carrying end user's packet data protocol (such as IP and X.25) information from/to a GPRS terminals to/from other GPRS terminals and/or external packet data networks.

GPRS is defined by various ETSI (European Telecommunications Standards Institute) specifications such as ETSI GSM 05.08 version 6.5.0 Release 1997, "Digital cellular telecommunications system (Phase 2+); Radio subsystem link control"; and ETSI GSM 04.60 version 6.4.0 Release 1997, "Digital cellular telecommunications system (Phase 2+); General Packet Radio Service (GPRS); Mobile Station (MS)—Base Station System (BSS) interface; Radio Link Control/Medium Access Control (RLC/MAC) protocol." See <http://www.3gpp.org>.

GPRS uses a time division multiple access (TDMA) scheme. In a TDMA scheme, over a given RF channel, each mobile station in a cell transmits and receives (to and from the base station) audio data and non-audio data packets during dedicated time slices or time slots within an overall TDMA cycle or epoch. Other communications schemes include frequency division multiple access (FDMA), code division multiple access (CDMA), and combinations of such schemes.

In GPRS networks, the allocation of GPRS radio channels is flexible: from 1 to 8 radio interface timeslots can be allocated per TDMA frame. Timeslots are shared by the active users, and uplink and downlink timeslots are allocated separately. The downlink refers to transmissions from the BTS to one or more mobile stations, while uplink refers to transmissions received by the BTS. The radio interface resources can be shared dynamically between speech and data services as a function of service load and operator preference.

In GPRS networks, timeslots are further subdivided into blocks. For example, one block of data is transmitted by a base station on a timeslot every 20 ms. These data blocks, sometimes referred to as Radio Link Control/Medium Access Control (RLC/MAC) blocks, contain a number of bits of data (e.g., 456 physical layer bits). A block can be intended for a particular mobile station. In addition, each downlink block contains a header containing control information called an Uplink State Flag (USF) that must be decoded by all mobiles in the cell of the BTS which are sending data uplink. The USF is used to coordinate uplink transmissions.

To exploit a wide range of carrier-to-interference (C/I) ratios available at different locations within a cell, GPRS networks employ four different airlink coding schemes. GPRS's lowest rate code, CS-1, employs a relatively high number of redundancy bits and offers a maximum LLC-layer throughput of 8 kbps/timeslot. The high level of redundancy present in blocks encoded using CS-1 ensures that mobile stations at the fringes of a cell, where C/I levels are typically lowest, are able to send and receive data. In contrast, the "highest rate" code, CS-4, offers maximum LLC-layer throughputs of 20 kbps/timeslot. Because of the small number of redundancy bits added to each block encoded with CS-4, however, airlink errors can be detected, but not corrected. As a result, CS-4 offers the best airlink performance at relatively high C/I ratios. The remaining two GPRS coding schemes offer maximum LLC-layer throughputs of 12 kbps/timeslot (CS-2) and 14.4 kbps/timeslot (CS-3).

By monitoring the quality of the airlink, mobile stations and the GPRS network can select the coding scheme that offers the best performance. The process of dynamically selecting the coding scheme based on airlink quality is called link adaptation. Quality can be measured, for example, by measuring the bit error rate (BER) or block error rate (BLER) of the channel.

GPRS networks have a single degree of freedom for selecting the coding used to transmit blocks over the air interface, the data encoding scheme to use for each radio block. In contrast, Enhanced GPRS networks (EGPRS) enjoy two degrees of freedom: selection of a modulation scheme—Gaussian Minimum Shift Keying (GMSK) or 8-ary Phase Shift Keying (8-PSK)—and selection of a data encoding scheme. A total of nine different Modulation and Coding Schemes (MCSs) are defined by the EGPRS system specifications.

Table 1 provides a summary of the maximum LLC-layer throughputs per timeslot achieved by each of EGPRS's modulation and coding schemes:

TABLE 1

| Scheme | Family | Modulation Scheme | Maximum LLC-layer throughput |
|---|---|---|---|
| MCS-1 | C | GMSK | 8.8 kbps/timeslot |
| MCS-2 | B | GMSK | 11.2 kbps/timeslot |}

TABLE 1-continued

| Scheme | Family | Modulation Scheme | Maximum LLC-layer throughput |
|---|---|---|---|
| MCS-3 | A | GMSK | 14.8 kbps/timeslot |
| MCS-4 | C | GMSK | 17.6 kbps/timeslot |
| MCS-5 | B | 8-PSK | 22.4 kbps/timeslot |
| MCS-6 | A | 8-PSK | 29.6 kbps/timeslot |
| MCS-7 | B | 8-PSK | 44.8 kbps/timeslot |
| MCS-8 | A | 8-PSK | 54.4 kbps/timeslot |
| MCS-9 | A | 8-PSK | 59.2 kbps/timeslot |

Four GMSK-based modulation and coding schemes used by EGPRS (MCS-1 through MCS-4) are defined. These coding schemes also provide backward compatibility with GPRS networks. The data encoding schemes used to send downlink blocks encoded with MCS-1 through MCS-4, for example, are encoded in such a way that GPRS mobiles are also able to decode the USF embedded in each downlink block. Hence, GPRS and EGPRS mobiles can have active Temporary Block Flows (TBFs) on the same timeslot simultaneously. A TBF is a radio link connection between a mobile station and a BTS of a network.

Additionally, EGPRS networks have introduced an RLC/MAC re-segmentation scheme as another tool to enable seamless switching between coding schemes in time-varying channels. The scheme allows errored RLC/MAC blocks to be re-segmented into an integral number of RLC/MAC blocks that are re-transmitted using a stronger modulation and coding scheme. To implement the scheme, EGPRS's nine modulation and coding schemes are divided into three coding families. Re-segmentation can only be done using MCSs belonging to the same family.

Due to its higher-level modulation, under similar channel conditions, 8-PSK modulation is not as robust as GMSK. To overcome the loss in performance introduced by 8-PSK modulation and to help increase airlink capacity, EGPRS networks have introduced another substantial improvement to the radio link control layer: support of incremental redundancy.

In systems employing incremental redundancy, re-transmissions of errored blocks carry additional redundancy bits to help the receiver correctly decode the block. In this manner, additional redundancy is added only when needed, potentially increasing the throughput of the airlink. Fields in the header identify the sequence number of the block and the redundancy scheme applied by the transmitter. The receiver can jointly decode multiple versions of the same block—so-called soft combining—improving receiver performance.

A link adaptation algorithm must select the proper modulation and coding scheme to use on the airlink. It must also determine whether blocks should be re-segmented before retransmission. The algorithm must adapt to changes in airlink quality.

Dynamic power control is a tool used for mitigating co-channel interference and extending mobile battery life in wireless networks. In GPRS/EGPRS networks, keeping co-channel interference levels low may enable high rate coding schemes to be used over the airlink. The lower interference levels achieved by power control can result in higher airlink throughputs over larger portions of the cell containing the BTS and mobiles, potentially increasing a cell's data traffic carrying capacity. Effective power control also ensures that timeslots used for EGPRS/GPRS applications do not cause unacceptable levels of interference to timeslots used for voice calls in co-channel neighbor cells.

Circuit-switched (e.g., voice) GSM and EGPRS networks use airlink resources in dramatically different ways. Circuit-switched GSM mobile stations have dedicated use of a single timeslot (or half a timeslot, for half rate users) for the entire duration of a call-periods of time that typically last tens of seconds to minutes. Additionally, these circuit-switched GSM mobile stations report channel quality measurements roughly twice a second.

In contrast, EGPRS users share a single timeslot simultaneously with several EGPRS or GPRS users in a cell. A single user may transmit and receive EGPRS data over multiple timeslots simultaneously. EGPRS radio link connections, i.e., TBFs, can be short-lived, lasting less than a few hundred milliseconds. The BTS measures the quality of each received uplink block from a mobile station. Since the EGPRS network polls mobiles with active uplink TBFs at will, airlink quality measurement reports sent by EGPRS users tend to be more sporadic than in circuit-switched GSM networks. In addition, messages carrying power control commands may not be sent at regular intervals.

In general, the GPRS standards specify various downlink power level requirements that specify, for example, a maximum permitted power level, a minimum permitted power level, and intermediate power levels. For example, a given GPRS network may specify that a downlink block must be transmitted at a power level no greater than a maximum wattage, and at a power level no lower than 10 dB lower than the maximum, and 2 dB increments between. The transmission has to be strong enough to be received by the intended mobile station, with acceptable quality (BER). Moreover, all blocks having header information intended for broadcast to all mobile stations in the cell must be transmitted at a strong enough transmit power to be received by all mobile stations of the cell, even those at the remote fringe or border of the cell.

It is desirable to reduce the downlink power as much as possible, while achieving acceptable airlink quality, so as to reduce co-channel interference. In conventional GPRS systems, a group of blocks, e.g. 10 blocks, are transmitted at a given power level. The base station typically polls a given mobile station having an active link at the end of the group of blocks (i.e., every measurement or reporting interval), to determine the airlink quality. The power level for the next group of blocks can then be adjusted, based on the BER measured at the prior power level, in an attempt to reduce power as much as possible while achieving an acceptable BER.

Uplink power control mechanisms in wireless packet data networks such as GPRS/EGPRS networks may allow the network to tune the transmit power used by each mobile station transmitting uplink RLC/MAC blocks. Uplink power control should provide an important added benefit: transmit power used by each mobile station can be reduced to levels adequate to achieve proper airlink performance, and no higher. Transmit power can be kept as low as possible without sacrificing airlink throughput, giving users peak airlink performance without unnecessarily draining the mobile station's battery.

SUMMARY OF THE INVENTION

The exemplary embodiments are directed to a method of controlling link transmission parameters, such as modulation and coding scheme and transmit power, of a communication flow in a network to achieve desired link quality, in which one or more network parameters are cached at the end of a first communication flow for a specified time, and adjusted for controlling link quality and transmit power of a next communication flow. The adjustment may be referred to as an aging process that is based on an uncertainty caused by caching for the specified time. Accordingly, the state of a communication channel during a previous communication flow (connection) may be used to determine network parameters to use at a future communication flow. When a connection begins, and the network does not know the ideal settings to use, the network defines the specified time, an elapsed time duration over which the state of a previous connection no longer can be trusted, i.e., an uncertainty period. Network parameters are adjusted to account for uncertainty caused by the elapsed time.

Additional exemplary embodiments are directed to link adaptation, downlink power control and uplink power control techniques that utilize the aforementioned caching and aging in an effort to reduce transmit power when possible, so as to effectively reduce interference in the network.

BRIEF DESCRIPTION OF THE DRAWINGS

Exemplary embodiments of the present invention will become more fully understood from the detailed description given hereinbelow and the accompanying drawings, wherein like elements are represented by like reference numerals, which are given by way of illustration only and thus are not limitative of the exemplary embodiments of the present invention and wherein:

FIG. 7 is a flow chart illustrating the caching of downlink power control state information at the end of a mobile station's downlink TBF;

FIGS. 8A and 8B is a flow chart illustrating a method for updating the USF flag attenuation level before selecting a power level to transmit a downlink block at time n on timeslot j;

FIG. 14 depicts a flow chart to illustrate caching information on the power levels used for a mobile's uplink TBF when the TBF ends, according to the invention.

DETAILED DESCRIPTION OF THE EXEMPLARY EMBODIMENTS

Figure 1:
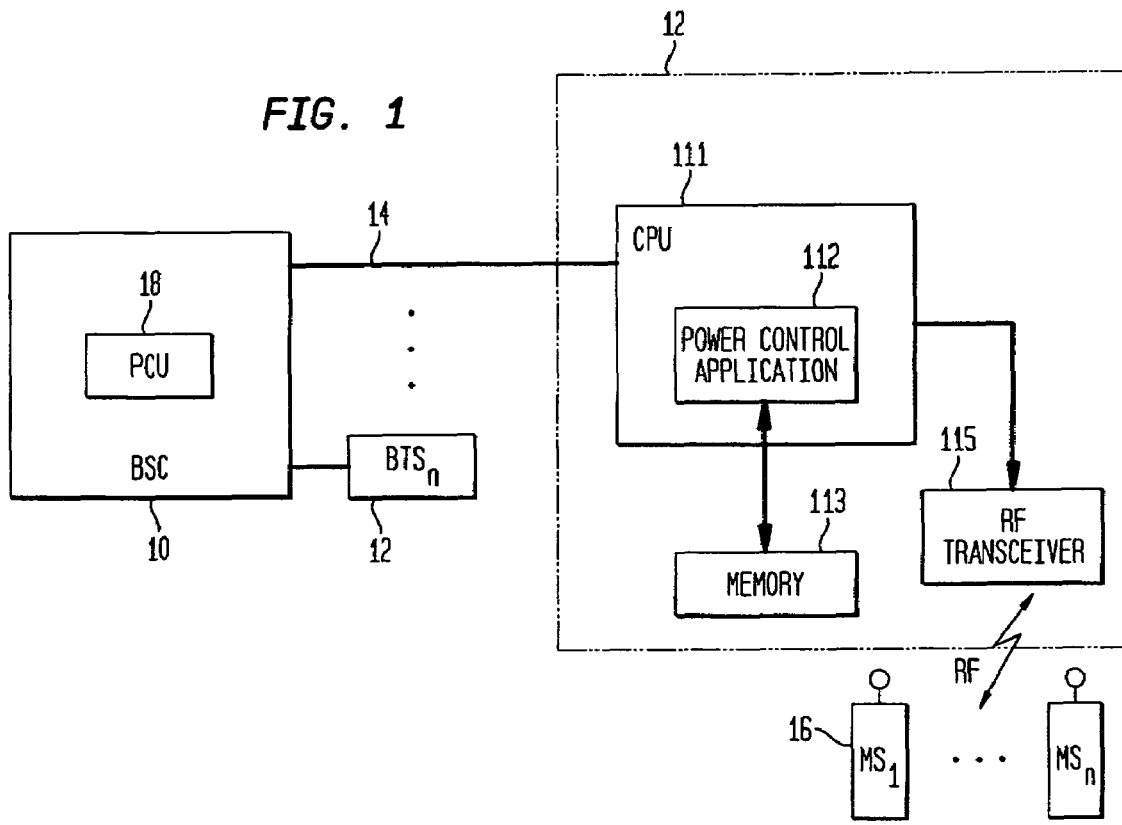
FIG. 1 illustrates an example of a portion of an Enhanced General Packet Radio Service (EGPRS) network.

The following description may be described as based on a wireless communication system such as a general packet radio service (GPRS) system or enhanced general packet radio service (EGPRS). Although exemplary embodiments will be described in this exemplary context, it should be noted that the embodiments shown and described herein are meant to be illustrative only and not limiting in any way. As such, various modifications will be apparent to those skilled in the art for application to other communications systems such as wireless packet data networks implementing the Universal Mobile Telecommunications System (UMTS) High Speed Uplink Packet Access (HSUPA) specification, UMTS High Speed Downlink Packet Access (HSDPA) specification, 1xEV-DO High Rate Packet Data (HRPD) specification, formerly know as the High Data Rate (HDR) specification, systems employing cdma2000 1xEV-DV technology, IEEE 802.16/20 standards, etc., and are contemplated by the teachings herein.

Where used below, a mobile station is a device providing data and/or voice connectivity to a user. A mobile station may be connected to a computing device such as a laptop, personal computer (PC), or it may be a self-contained data device such as a personal digital assistant (PDA). Accordingly, a mobile station is equivalent to, and may be also be referred to as a mobile, wireless mobile, remote station, user, user equipment (UE), subscriber, subscriber user, access terminal or any other remote user of wireless resources in a wireless communications network. Additionally, a base station refers to network equipment providing data connectivity between a packet data network, typically the Internet, and the mobile station. A base station is equivalent to, and may also be referred to as a base transmitter station, base transceiver station, access network, Node-B, access point, or any other equipment providing data connectivity between one or mobiles and a communication system or network. An access network may also comprise one or more base stations.

Wireless packet data networks such as GPRS, EGPRS, etc., send data to and from mobiles by setting up connections, sending data, and then tearing the connections down. The connections tend to be very short. And, unlike with voice calls, the chance that another data connection will be set up shortly after one is torn down is very high.

Since radio conditions don't change that quickly from one connection to the next, it makes sense for the network to remember elements of the state of the channel observed during the previous connection, and transmission parameters used during the previous connection, in order to assist the network in determining transmission parameters to use in subsequent connections. For downlink power control algorithms, the network remembers the downlink power last used. For uplink power control, the network remembers the uplink power the mobile last used. For downlink link adaptation, the network remembers the quality of the downlink and the modulation and coding scheme that was last used. For uplink link adaptation, the network remembers the quality of the uplink and the modulation and coding scheme that was last used.

The exemplary embodiments of the present invention are directed to caching and aging techniques to enable a network to do the above, so as to conserve transmit power and perhaps reduce interference in the network. In general, the state of the channel during a previous connection is used to determine network parameters to use at a future connection. When a connection begins, and the network does not know the ideal settings to use, the network initially uses overly conservative values. The purpose of aging in the context of the exemplary embodiments is to define a time duration over which the state and transmission parameters of a previous connection no longer can be trusted. Transmission parameters are therefore adjusted to account for uncertainty caused by the elapsed time.

In accordance with the exemplary embodiments, as to be described in further detail hereafter, a link adaptation method, downlink power control method and uplink power control method utilize caching and aging schemes to enable a quick reduction in transmit power when possible, in an effort to effectively reduce interference in the network.

Terms, Acronyms, and Abbreviations

Below are listed various terms, acronyms, and abbreviations employed in this application.

Ack Acknowledgment
AGC Automatic Gain Control
BCCH Broadcast Common Control Channel
BER Bit Error Rate
BLER Block Error Rate
BTS Base Transceiver Station
C/I Carrier to Interference ratio
CS-x Coding Scheme-x (x=1, . . . ,4)
DB Decibels
Downlink The base station-to-mobile station communications channel
FH Frequency Hopping
GPRS General Packet Radio Service
GSM Global System for Mobile Communication
Kbps Kilobits per second
LLC Logical Link Control
MAC Medium Access Control
MS Mobile Station
Nack Negative acknowledgement
PACCH Packet Associated Control Channel
PDCH Packet Data Channel
PTCH Packet Timing Channel
RA Rural Area
RLC Radio Link Control
TBF Temporary Block Flow
TDMA Time Division Multiple Access
TU Typical Urban
Uplink The mobile station-base station communications channel
USF Uplink State Flag FIG. 1 illustrates an example of a portion of an Enhanced General Packet Radio Service (EGPRS) network. FIG. 1 illustrates an example of a portion of an Enhanced General Packet Radio Service (EGPRS) network. As shown, a base station controller (BSC) 10 communicates with one or more base transceiver stations (BTS) 12 over A-bis interface 14. The BTSs 12 communicate in a wireless fashion with mobile stations, such as mobile station 16, in their respective cells (not shown for the purposes of clarity).

The BSC 10 includes a packet control unit (PCU) 18 that prepares control and information data for transmission by the BTSs 12 to mobile stations according to the well-known EGPRS RLC protocol. The PCU 18 also processes data received from the mobile stations via the base transceiver stations 12 according to the EGPRS RLC protocol. More specifically, the PCU 18 performs the link adaptation methodology of the present invention. This involves selecting the downlink modulation and coding scheme (MCS) based on channel quality measurements received from the mobile station 16, and selecting an uplink modulation and coding scheme, which is sent as control information to the mobile station, based on channel quality measurements by the BTS 12.

BTS 12 includes an RF transceiver (transmitter/receiver) 115 coupled to a computer having CPU 111 and memory 113. CPU 111 runs a power control application 112 in accordance with the present invention, which determines the transmit power to be used before transmitting each downlink block by the transmitter of transceiver 115. CPU 111 also runs a suitable RLC/MAC application (not shown) which segments packets received from an external network into downlink blocks, and also reassembles packets from uplink blocks received from mobile stations.

CPU 111 also runs power control application 112 to determine the transmit power to be used before transmitting each uplink block from the mobile stations 120 to the BTS 110. CPU 111 and its power control application 112, which run the uplink power control algorithm of the present invention, may also frequently and collectively be referred to hereinafter as a remote packet control unit (rPCU). As with downlink power control, CPU 111 also runs a suitable RLC/MAC application (not shown) which segments packets received from an external network into downlink blocks, and also reassembles packets from uplink blocks received from mobile stations.

For both downlink and uplink power control, the base station transmit power is set as low as possible, but high enough so that any destination mobile m will be able to successfully decode the block with acceptable BLER, and so that any other mobiles in the cell of the BTS which are sending data uplink can successfully decode the uplink state flag of the block with an acceptable error rate.

Power control application 112 calculates a power control parameter in accordance with a modulation and coding scheme and in accordance with link quality measurements observed during since the start of the measurement interval. This is to determine the power level the mobile m should be using.

If the power level has been determined, application 112 updates power control parameters and sends and updated power level command to the mobile station, and a new measurement interval begins. If the interval last too long and application 112 determines that measurements taken over the measurement interval may no longer reflect the current quality of the channel, application 112 increases the mobile station m's transmit power to a predetermined maximum power level, so that a new measurement interval begins.

Link Adaptation

To support link adaptation, the RLC/MAC layer provides mechanisms for mobile stations to report downlink quality measurements. Downlink channel quality reports provide the wireless packet data network with information it needs to select appropriate modulation and coding schemes to use in the downlink for each mobile station, and to revise the decision as channel quality changes. The RLC/MAC layer also provides mechanisms for the network to guide each mobile on which modulation and coding schemes to use for uplink transmissions.

Estimating BEP

Link quality measurements in EGPRS are based on Bit Error Probabilities (BEP). An EGPRS network has two tools to combat high airlink block error rates: (a) Power: The network can increase transmit power, provided the mobile or network are not already transmitting at maximum power levels; and (b) Code rate and modulation scheme: The network can select a coding scheme with a lower code rate and more robust modulation scheme.

Link adaptation and power control algorithms are necessarily based on a common assumption: channel conditions caused by path loss, shadow fading and interference in the near future will be similar to those observed in the recent past. If sufficient care is not taken, however, power control and link adaptation algorithms can work against one another. Consider, for example, the painful consequences of a decision by a link adaptation algorithm to jump from MCS-1 to a less robust modulation and coding scheme MCS-3 without taking into account the effects of a simultaneous 10 dB drop in transmit power commanded by a power control algorithm.

Power control algorithms adjust power in attempt to maintain channel quality within a desired quality range. For example, when bit error rates are lower than the target bit error rate range and the mobile is not already using minimum transmit power, the uplink power control algorithm will decrease the mobile's transmit power. When bit error rates are higher than the target bit error rate range and the mobile is not already using maximum uplink transmission power, the uplink power control algorithm will command the mobile to increase transmit power.

Figure 2:
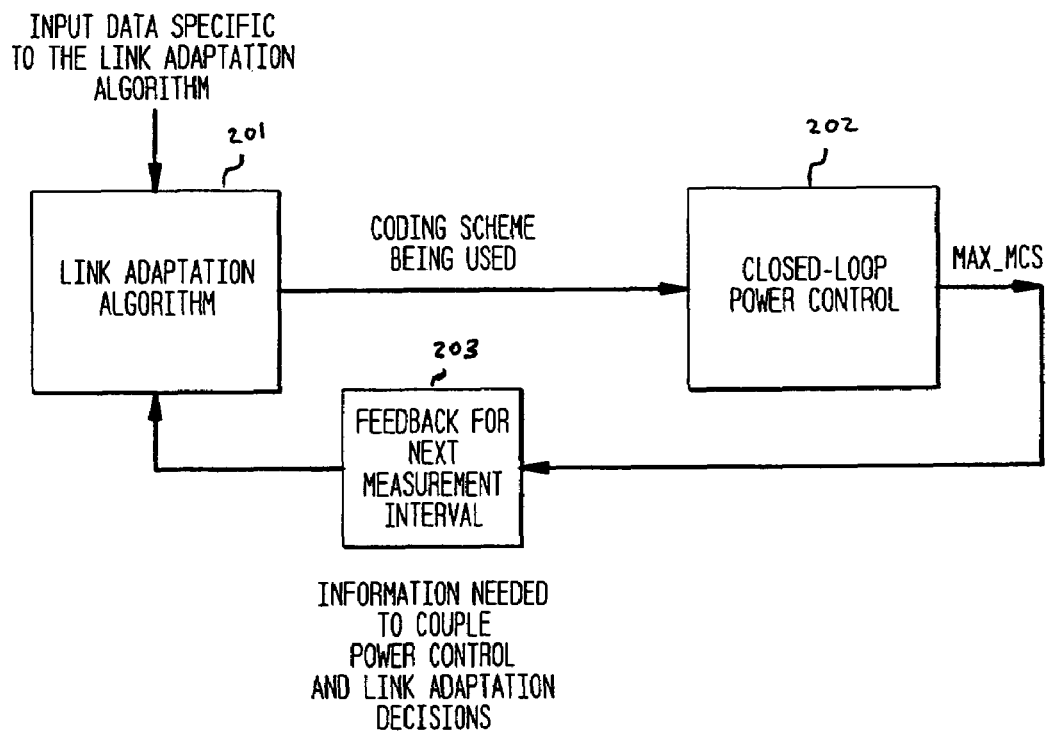
FIG. 2 illustrates the loose coupling between closed-loop power control and link adaptation according to the invention.

FIG. 2 illustrates the loose coupling between closed-loop power control and link adaptation according to the invention. As shown, the link adaptation algorithm 201 informs the power control algorithm 202 about the weakest coding scheme which may be used over the airlink in the next measurement interval. The power control algorithm 202 then selects the target bit error rate, or equivalently, the target C/I, accordingly. Next, the power control algorithm 202 sets a variable MAX_MCS, which indicates the maximum coding scheme that the link adaptation algorithm 201 should use in the next measurement interval so that the interference caused to neighbor cells is tolerable. This variable depends on the level of attenuation being used by the mobile. In general, the higher the level of attenuation, the larger the value of MAX_MCS. In FIG. 2, feedback for a next measurement interval 203 loosely couples the link adaptation algorithm 201 and the power control algorithm 202.

Intuitively, if the level of attenuation is high, i.e., the transmit power level is low, then the interference being caused to neighbor cells is also low. At such times, the link adaptation algorithm should be allowed to take advantage of coding schemes that require high C/I and yield high throughput if the prevalent channel conditions permit its usage. If on the other hand, the transmit power is high, then the interference being caused is also high. So, the link adaptation algorithm should be restricted to using coding schemes which require low C/I. This, in turn, would allow the possibility of reducing the transmit power level, thereby reducing interference. If pure open-loop uplink power control is applied, or if constant transmit power is used on the air interface, the link adaptation algorithm is allowed to use all EGPRS coding schemes.

Caching and Aging

Data transfer for EGPRS applications may tend to be "bursty", i.e., several packets sent over a relatively short period of time. For such applications, the period of time between packets may be long enough for TBFs to be torn down. TBFs for mobiles running such applications will be short-lived. However, once a TBF is torn down, another will likely be set up again.

Path-loss, shadow fading, and interference conditions in some cellular environments (in particular, those not employing aggressive re-use) tend to be highly correlated over short periods of time (on the order of a few seconds). Channel quality is fairly static over short periods of time. As a result of this high correlation, back-to-back downlink (uplink) TBFs are likely to experience similar airlink quality, so similar transmission parameters may be used. The PCU 18 takes advantage of this high level of correlation to properly select the starting MCS for a new TBF, based on quality information from the old one. At the end of each TBF, the PCU 18 caches the logBEP and CVBEP values as well as PrevTRX, the identity of the transmitter-receiver (TRX) on which the mobile's last TBF was established, and the time PrevFN (frame number) at which the TBF ended.

CVBEP is the coefficient of variation of the bit error probability (BEP) of the block. This value is defined as the standard deviation of the average BEP in each of the four bursts comprising a block divided by the mean bit error probability calculated over all bursts comprising the block. CVBEP is a measure of how the bit error probability is distributed among the four bursts comprising the block. If a TBF starts in the near future on the same TRX as the old one, the cached value of logBEP will be aged to account for uncertainty.

Such aging of the cached value of logBEP can be accomplished as follows in expression (1):

$$\log \text{BEP} \leftarrow \log \text{BEP} + \min(\text{max\_age}, (\text{CurFN}-\text{PrevFN}) \cdot \text{age\_rate}) \quad (1)$$

where CurFN is the frame number of the new BF, max_age and age_rate are parameters which control the maximum amount a cached value of logBEP may be increased, and age_rate denotes the rate at which the aging occurs. If the TBF starts on a different TRX, a margin will be added to the cached value of logBEP to account for quality differences among TRXs, as shown in expression (2):

$$\log \text{BEP} \leftarrow \log \text{BEP} + \min(\text{max\_age}, (\text{CurFN}-\text{PrevFN}) \cdot \text{age\_rate}) + \text{TRXoffset} \quad (2)$$

where TRXoffset denotes the margin which should be added to account for quality differences between different TRXs in the same cell.

Figure 3:
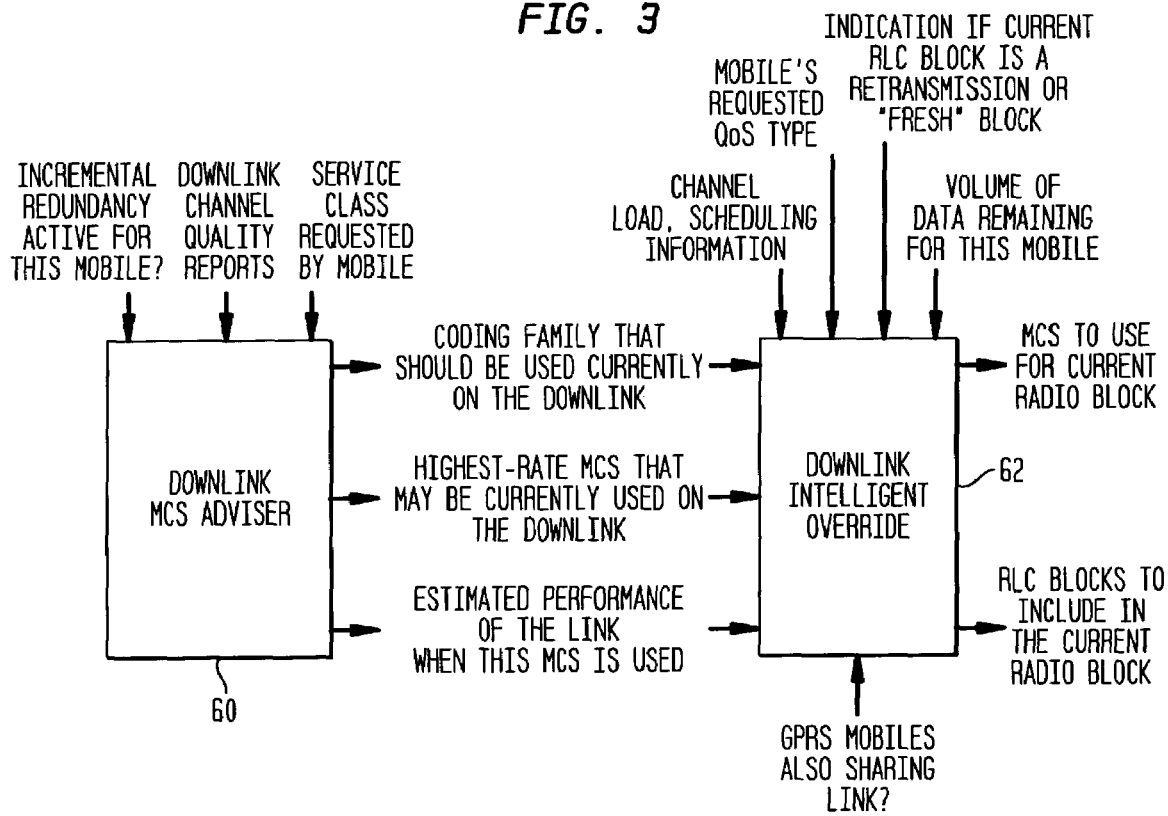
FIG. 3 illustrates a high-level architecture for downlink link adaptation according to the invention.
Figure 4:
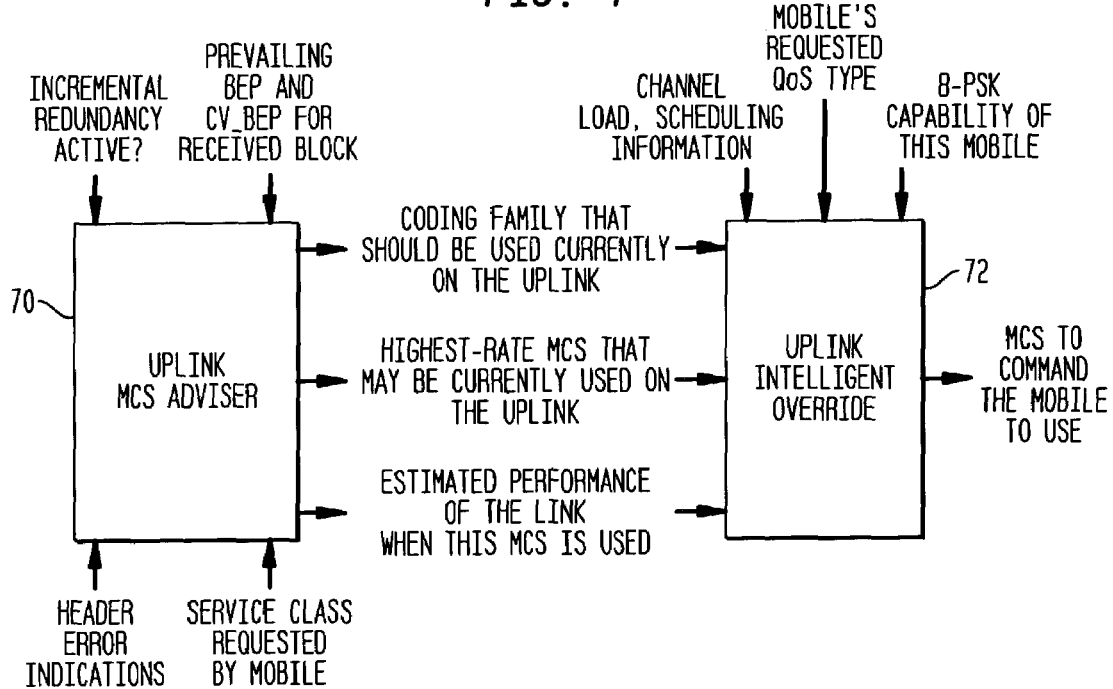
FIG. 4 illustrates a high-level architecture for uplink link adaptation according to the invention.

To make development and testing go smoothly over the lifetime of link adaptation and scheduling features, it is desirable to phase in additional complexity as and when needed. FIGS. 3 and 4 illustrate high-level architectures for GPRS/EGPRS link adaptation.

A High-Level Architecture for Downlink Link Adaptation

A high-level architecture for downlink link adaptation algorithm is shown in FIG. 3. The high-level architecture separates downlink link adaptation decisions for each mobile with an active downlink TBF into two functional blocks: a downlink MCS advisor 60 and a downlink intelligent override 62. CPU 11 in BTS 12 may implement the downlink MCS advisor 60 and a downlink intelligent override 62.

The downlink MCS adviser 60 monitors the quality of a mobile station's Temporary Block Flow over the TBF's lifetime based on mobile-reported BEP and CVBEP values included in channel quality reports. When downlink TBFs begin for a mobile, the downlink MCS adviser 60 looks to see whether there is information on channel quality from a previous downlink TBF with the mobile that could be used to help determine an initial MCS. The downlink MCS adviser 60 consults tables chosen based on whether IR is active and the desired service as discussed above to determine the MCS to use for transmission. In support of QoS, the downlink MCS adviser 60 also provides estimates of airlink performance for all MCS' under the current prevailing channel conditions. For example, the downlink MCS adviser 60 generates an estimate of what the BLER would be without IR at the suggested MCS, i.e., useful information for the downlink intelligent override 62 to help make decisions to minimize packet delay.

The downlink intelligent override 62 contains logic to determine whether it is advantageous to use a stronger modulation and coding scheme than the one suggested by the downlink MCS adviser 60. For example, logic to look at the amount of remaining data and determine whether a stronger code in the same family would result in the same number of downlink radio blocks resides here. Logic to weigh data size and load to determine whether delay performance would be better by downshifting resides here. If there are GPRS mobiles on the link, the downlink intelligent override 62 determines an appropriate GMSK coding scheme. Logic for whether to re-segment retransmitted RLC blocks also resides here.

The downlink MCS adviser 60 operates when a downlink TBF starts for a mobile, any time downlink channel quality reports are received from the mobile, any time the mobile's downlink TBF is assigned new timeslots, and any time a TBF ends. It provides information on the weakest modulation and coding scheme that can be used successfully for downlink transmissions to the mobile for the service being provided over the TBF. The downlink intelligent override 62 operates each time a downlink radio block is to be sent to a mobile. It determines the MCS that should be used to encode the current radio block, as well as which RLC blocks should be packed into the radio block.

A High-Level Architecture for Uplink Link Adaptation

FIG. 4 shows a high-level architecture for the uplink link adaptation feature. As in the architecture of the downlink link adaptation algorithm, the uplink link adaptation feature is divided into two functional blocks: an uplink MCS advisor 70 and an uplink intelligent override 72. CPU 11 in BTS 12 may implement the uplink MCS advisor 70 and an uplink intelligent override 72. Alternatively, these functions may be implemented at mobile station 16.

The uplink MCS adviser 70 tracks the quality of a mobile station's uplink Temporary Block Flow over the TBF's lifetime based on BEP and CVBEP values included in each PCU frame corresponding to an uplink radio block allocated to the mobile. The uplink MCS adviser 70 also monitors header error rates to influence coding decisions. When uplink TBFs begin for a mobile, it looks to see whether there is information on channel quality from a previous uplink TBF with the mobile that could be used to help determine an initial MCS. The uplink MCS adviser 70 consults tables chosen based on whether IR is active and the desired service as discussed above to determine the MCS to use for transmission. If abnormally high radio block header error rates are observed when the mobile has been assigned an 8-PSK coding scheme, the uplink MCS adviser 70 suggests a GMSK-based modulation and coding scheme. In support of QoS, the uplink MCS advisor 70 also provides estimates of airlink performance for all MCS' under the current prevailing channel conditions.

The uplink intelligent override 72 includes logic to override the modulation and coding scheme selections for mobiles that are not 8-PSK capable. If a mobile is only capable of using GSMK-based schemes, the uplink intelligent override 72 assigns the weakest GMSK-based scheme that is stronger than the one suggested by the uplink MCS adviser 70.

The uplink MCS adviser 70 is invoked when an uplink TBF starts for a mobile, any time a PCU frame corresponding to an uplink block allocated to the mobile is received by the PCU 18, any time the mobile's uplink TBF is assigned new timeslots, and when the mobile's uplink TBF ends. The uplink MCS adviser 70 provides information on the weakest modulation and coding scheme that can be used successfully for uplink transmissions to the mobile for the service being provided over the TBF. The uplink intelligent override 72 is invoked any time a channel coding command is sent to the mobile, any time the PCU 18 sends a Packet Uplink Ack/Nack or Packet Uplink Assignment message to the mobile.

Downlink Power Control

In accordance with the exemplary embodiments of the present invention, a downlink power control method controls the power used for downlink transmissions of each block. In an exemplary embodiment, a group of blocks is transmitted between polling or measurement intervals. The last block polls the mobile station for airlink quality. This airlink quality measurement reported by the mobile is an average of the airlink quality of a previous group of blocks. Each block of a group of blocks is transmitted at a potentially different power level, and the downlink power control method determines an initial or baseline power transmission level for blocks of the next group of block, and a potentially different power level for each block of the group of blocks, based on the average downlink quality of the previous group of blocks.

The downlink power control algorithm requires the estimation of two quantities, $\Delta^{(m)}_{RLC}$ and $\Delta_{USF}^{(j,n)}$. The radio link attenuation level, $\Delta^{(m)}_{RLC}$, denotes the downlink attenuation that mobile station m can tolerate while still achieving acceptable RLC/MAC performance. In other words, downlink RLC/MAC blocks sent to mobile station m using downlink transmit power, as measured from a Broadcast Common Control Channel level (BCCH_LEVEL) and an assigned power reduction (P0) for mobile station m relative to BCCH transmit power (BCCH_LEVEL–P0–$\Delta^{(m)}_{RLC}$) dB, experience acceptable bit and block error rates. The parameter $\Delta^{(m)}_{RLC}$ is adjusted based on a RXQUAL value received in each channel quality report sent by mobile station m.

When CS-1, CS-2 or CS-3 are used, RX_QUAL is the mobile station's estimate of the mean bit error rate of the downlink channel since the last channel quality report was sent. As discussed in the next section, BER is also fairly insensitive to channel propagation effects, and is a good indicator of received C/I levels when these coding schemes are used. It is important to note that BER values are only calculated over RLC/MAC blocks addressed to the mobile which were successfully decoded. As a result, the RX_QUAL values reported by mobiles under high block error rates may give unreliable indications of channel quality.

When CS-4 is used on the downlink, a mobile station is allowed to report RX_QUAL=7, regardless of the bit error rate of the channel. See the ETSI GPRS 05.08 system specification. As a result, RX_QUAL is a meaningless measure of link quality when CS-4 is used.

An uplink control flag attenuation factor $\Delta_{USF}^{(j,n)}$ denotes the estimated additional downlink attenuation that can be applied such that adequate USF flag performance is achieved when the nth downlink block is sent on timeslot j. The algorithm adjusts $\Delta_{USF}^{(j,n)}$ when uplink TBFs are initiated, when USF flags are missed, or uplink collisions are observed. $\Delta^{USF}$ $(j,n)$ is increased if a suitably long period of time passes during which uplink TBFs are active and no USF flag problems are observed.

To ensure that downlink blocks are transmitted at power levels high enough for the intended mobile station m as well as mobile stations x with active uplink TBFs, a downlink block transmitted on timeslot j to mobile m at time n is transmitted with power [BCCH level–P0–min$\{\Delta^{(m)}_{RLC}, \Delta_{USF}^{(j,n)}\}$].

Due to the sporadic nature of data transfer and the small volume of data that will likely be transferred between the network and mobile stations during data transactions, downlink and uplink TBFs will likely last on the order of seconds or less. Power control algorithms must quickly reduce power when possible, otherwise, downlink power control will be ineffective at reducing interference.

Accordingly, the downlink power control method in accordance with the exemplary embodiments utilizes a caching and aging scheme to enable a quick reduction in transmit power when possible, in an effort to effectively reduce interference in the network. Temporal caching and aging may provide additional reductions in transmit power level, thereby reducing interference in the network.

Temporal Correlation for Bursty Downlink TBFs

Power adjustments in response to a measurement report can result in substantial reductions in transmit power levels for long-lived TBFs. For TBFs consisting of only a few downlink blocks, however, this mechanism alone will not result in any reduction in downlink transmit power: by the time the first measurement report is received, there may be no more downlink blocks to send to the mobile. Such "short-lived" TBFs will likely be common in wireless data networks such as GPRS/EGPRS networks. Hence, in an exemplary embodiment, the downlink power control method of the present invention is further modified to take this into account, as described below.

Data transfer for GPRS/EGPRS applications may tend to be "bursty," i.e. several packets sent over a relatively short period of time. For such applications, the period of time between packets may be long enough for a downlink TBF to be torn down. TBFs for mobiles running such applications will be short-lived. However, once a TBF is torn down, another will likely be set up again soon after.

Downlink power control may be employed to reduce transmit power even for users running such bursty data applications. Path-loss, shadowing, and interference conditions in the cellular environment tend to be highly correlated over short periods of time (on the order of seconds). As a result of this high correlation, a downlink TBF with mobile station m (i.e., mobile station 16) beginning a short period of time after its previous downlink TBF on the same timeslot can be expected to experience similar airlink quality. Thus, in an exemplary embodiment, a feature of the downlink power control algorithm of the present invention takes advantage of this correlation using caching and aging techniques, as follows.

Caching and Aging for Downlink Power Control

At the end of each downlink TBF, the algorithm caches both $\Delta^{(m)}_{RLC}$ and the time $\Delta^{(m)}_{RLC}$ was last updated. This may be stored in memory 113 by CPU 111, running application 112, for example. When a subsequent downlink TBF is established for mobile station m, $\Delta^{(m)}_{RLC}$ and the time of the last update are retrieved from the algorithm's cache in memory 113. The algorithm decreases $\Delta^{(m)}_{RLC}$ to account for the time that had elapsed since mobile station m's previous downlink TBF. If a suitably long period of time has passed since the previous TBF, or if the previous TBF ended abnormally, the algorithm sets $\Delta^{(m)}_{RLC}=0$ for subsequent TBFs.

Figure 5:
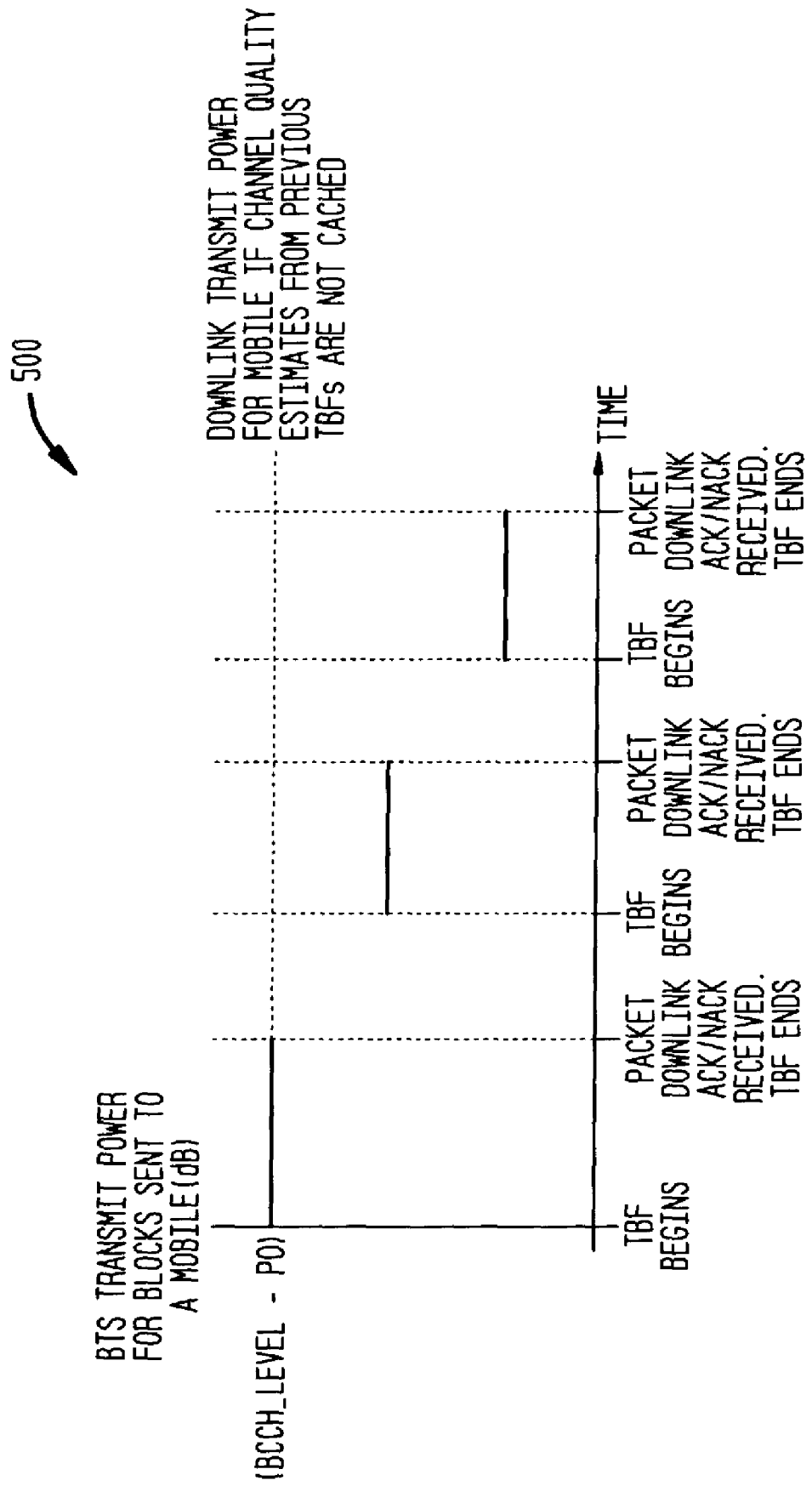
FIG. 5 is a graph illustrating additional reductions in transmit power level using the temporal correlation caching technique of the present invention.

FIG. 5 is a graph illustrating additional reductions in transmit power level using the temporal correlation caching technique of the present invention. FIG. 5 illustrates the benefits of caching in accordance with the present application. Referring now to FIG. 5, there is shown a graph 500 illustrating additional reductions in transmit power level using the temporal correlation caching technique described above, i.e. when RF channel quality is cached from one TBF to the next.

In an exemplary embodiment, the downlink power control algorithm dynamically adjusts $\Delta_{USF}^{(j,n)}$ as new uplink TBFs start, in response to missed USF flags or collisions on channel j, and if suitable long periods of time pass during which no USF errors are observed. Since uplink TBFs are also likely to be short-lived and bursty, each time an uplink TBF with mobile m ends, the algorithm caches the current value of $\Delta^{USF(j,n)}$ and the time the uplink TBF ends. An aging mechanism similar to the one used for $\Delta^{(m)}_{RLC}$ is applied to the value of $\Delta_{USF}^{(j,n)}$ cached at the end of mobile m's last uplink TBF.

Variables to help specify the downlink power control algorithm are summarized in Table 2. Table 3 summarizes the algorithm's tunable parameters. The notation [x]+is used to denote a mapping of x onto an element in the set $\{0, 2, 4, 6, 8, 10\}$. Other mappings may also be used.

TABLE 2

Variables used by the downlink power control algorithm

| Variable | Units | Definition |
|---|---|---|
| $\Delta_{RLC}^{(m)}$ | dB | Estimated additional downlink attenuation under which mobile station m will experience acceptable RLC/MAC performance. With high probability, mobile station m will correctly decode an RLC/MAC block encoded with CS-2 and transmitted at power level (BCCH level − P0 − $\Delta_{RLC}^{(m)}$) dB. (0 dB ≤ $\Delta_{RLC}^{(m)}$ ≤ 10 dB) |
| P0$^{(m)}$ | dB | Assigned power reduction for user m relative to BCCH transmit power. Consistent with the requirements imposed by PR_MODE_B, the algorithm will assign the same value of P0$^{(m)}$ to all users in the cell. (P0$^{(m)}$ ≥ 0 dB) |
| $\Delta_{AVG}^{(m)}$ | dB | Average additional downlink attenuation used to send downlink RLC/MAC blocks to mobile station m. (0 dB ≤ $\Delta_{AVG}^{(m)}$ ≤ 10 dB) |
| $\Delta_{USF}(j, n)$ | dB | Average additional downlink attenuation on timeslot j at time n which results in acceptable USF flag performance for all mobiles in the cell with active uplink TBFs. (0 dB ≤ $\Delta_{USF}(j, n)$ ≤ 10 dB) |
| $\Delta(j, n_{curr})$ | dB | Additional downlink attenuation used to send a downlink block on timeslot j at the current time. (0 dB ≤ $\Delta(j, n_{curr})$ ≤ 10 dB.) |
| $Q_{RLC}^{(m)}$ | unitless | Quantity tracked by network for power control to compensate for different attenuation levels used to send downlink blocks to mobile station m during a reporting period. |
| $\Delta_{RLC}^{*(m)}$ | dB | Additional downlink attenuation needed to meet mobile station m's target BER as estimated from the RX_QUAL level reported by mobile station m. (dB) |

TABLE 2-continued

Variables used by the downlink power control algorithm

| Variable | Units | Definition |
|---|---|---|
| $BER^{*(m)}$ | Bit error rate (%) | Target bit error rate (%) for mobile station m. Will be the same for all mobiles with only CS-1 and CS-2 deployed. IF CS-3 is also deployed, this value will depend on how far mobile is away from base station, current interference levels, and so on. With only CS-1 and CS-2, $BER^{*(m)}$ is the same for all mobile stations in the cell. ($BER^{*(m)} = 3\%$) |
| $BER^{(m)}$ | Bit error rate (%) | Assumed mobile-reported bit error rate (%) for mobile m based on the RXQUAL level reported in mobile m's measurement report. |
| $RXQUAL_{meas}^{(m)}$ | unitless | The RXQUAL value reported by mobile m in a channel quality report. ($0 \leq RXQUAL_{meas}^{(m)} \leq 7$) |
| $BLER_{meas}^{(m)}$ | Block error rate (%) | Block error rate (%) as estimated from the number of blocks incorrectly received by mobile station m over the measurement interval. |
| $n_{cache}^{(m)}$ | seconds | The index of the block when mobile m's last uplink or downlink TBF ended. |
| $n_{curr}$ | seconds | Index of block currently being transmitted. |
| $NBLK^{(m)}$ | unitless | Cumulative number of downlink RLC/MAC blocks that have been sent to mobile station m since the last channel quality report was received. |

TABLE 3

Tunable parameters used by the downlink power control algorithm

| Algorithm tunable parameter | Units | Definition |
|---|---|---|
| P0 | dB | Attenuation on PDCH relative to BCCH used for all mobile stations in the assignment message. $P0 \geq 0$. |
| BCCH_level | dB | BCCH power level. |
| $RX_{emergency}$ | unitless | If $RXQUAL_{meas}^{(i)} \geq RX_{emergency}$, the algorithm will make an "emergency" change to the additional downlink attenuation level used for mobile i. ($0 \leq RX_{desired} < RX_{emergency} \leq 7$.) |
| $BER^*$ | unitless | Desired RXQUAL level for acceptable RLC/MAC performance. ($0 \leq RX_{desired} \leq 7$.) |
| $\Delta_{emergency}$ | dB | Decrease in additional downlink attenuation in response to a very bad RXQUAL value. (Must be a multiple of 2 with $0 < \Delta_{emergency} \leq 10$.) |
| $BLER_{emergency}$ | % | Block error rate during a measurement interval beyond which we can no longer trust the BER value reported by a mobile station. |
| $\Delta_{USF}^{START}$ | dB | Attenuation level to use for a mobile with an uplink TBF when no uplink power control state information is available in the algorithm's cache. ($0 \leq \Delta_{USF}^{START} \leq 10$ dB.) |
| $\alpha$ | Ln(BER)/(C/I in dB) | Slope of the ln(BER) versus C/I (dB) plot. ($\alpha < 0$) |
| p | unitless | Gain used to dampen increases in additional downlink attenuation made in response to channel quality reports. ($0 < p \leq 1$) |
| $r_{RLC}$ | dB/block | Rate at which cached values of $\Delta_{RLC}^{(m)}$ are aged over time. ($r_{RLC} > 0$.) |
| $r_{USF}$ | dB/block | Rate at which cached values of $r_{USF}$ are aged over time. ($r_{USF} > 0$.) |

TABLE 3-continued

Tunable parameters used by the downlink power control algorithm

| Algorithm tunable parameter | Units | Definition |
|---|---|---|
| $N_{RT}$ | blocks | Number of blocks between the time a USF flag is sent, and the BTS receives feedback of whether there was a collision. |
| USF_DECR | dB | Decrease in $\Delta_{USF}$ (j, n) made in response to a collision/missed USF flag. (Must be a multiple of 2 with $0 < USF\_DECR \leq 10$.) |
| USF_INCR | dB | Increase in $\Delta_{USF}$ (j, n) when no collisions/missed USF flags are observed after a suitable period of observation. (Must be a multiple of 2 with $0 < USF\_INCR \leq 10$.) |
| W | blocks | Window over which we observe whether USF errors have occurred to determine whether it is OK to increase USF flag attenuation level $\Delta_{USF}$ (j, n) (W > 0.) |
| K | blocks | Minimum number of times downlink blocks have been sent using the USF flag attenuation level during the USF flag observation window W before we can increase the USF flag attenuation level. ($0 < K \leq W$.) |

Downlink Power Control Initialization at the Start of a Downlink TBF

Figure 6:
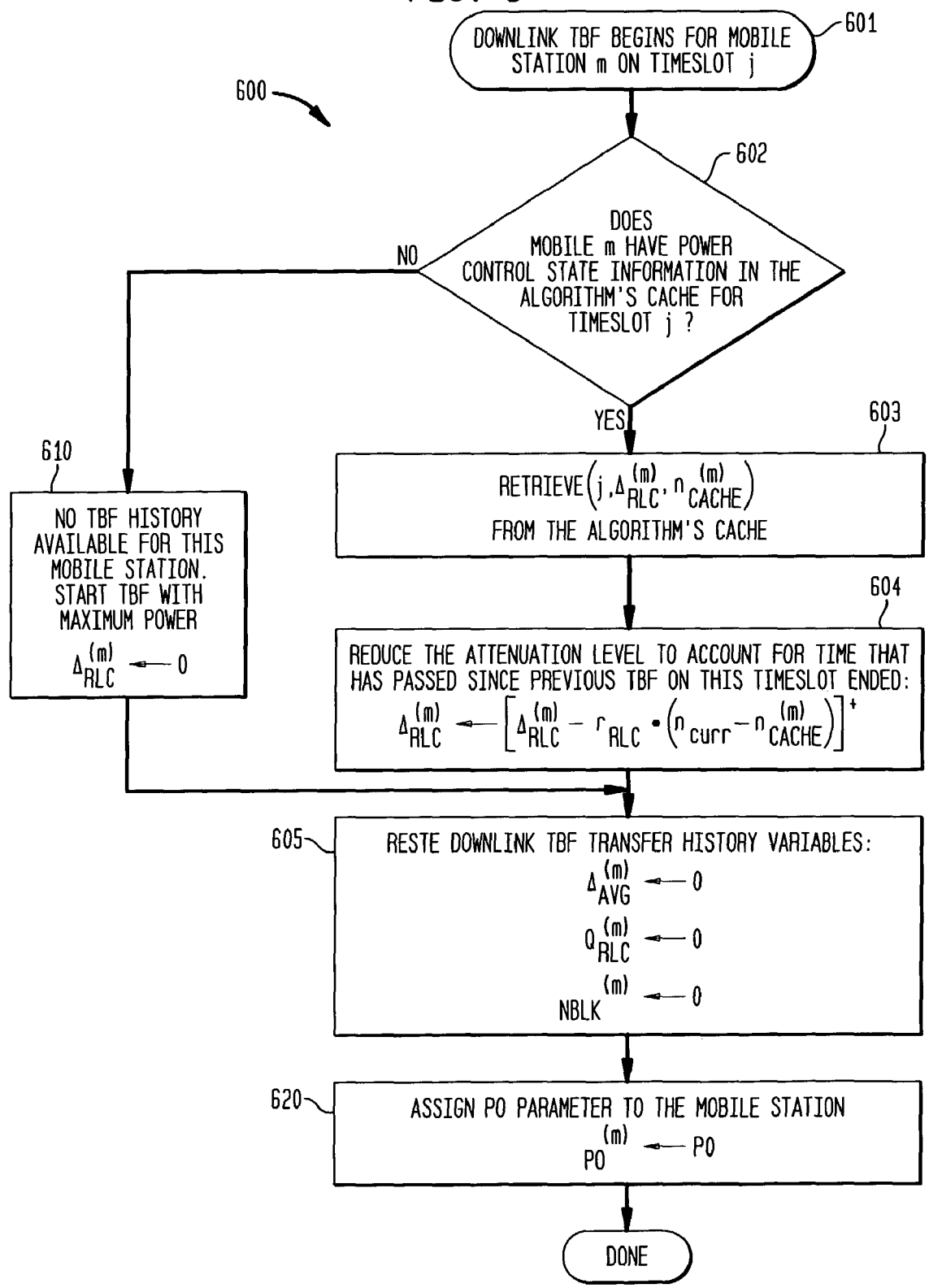
FIG. 6 is a flow chart illustrating the procedure for selecting $\Delta^{(m)}_{RLC}$ and initializing downlink power control variables at the start of mobile m's downlink TBF, in accordance with the invention.

FIG. 6 is a flow chart illustrating the procedure for selecting $\Delta^{(m)}_{RLC}$ and initializing downlink power control variables at the start of mobile m's downlink TBF, in accordance with the invention. A downlink TBF begins for a mobile station m at timeslot j (function 601). If mobile m does not have power control state information for timeslot j in the cache, then there is not TBF history available for the mobile station, and the TBF is started with maximum power (functions 602, 610). Otherwise, the power control state information is retrieved from the cache (function 603), and the attenuation level is reduced, based on this information and based on the time elapsed (step 604). Then, whether or not the history information was available, the downlink TBF transfer history variables are reset, and P0 parameters are assigned to the mobile station m (functions 605, 620). Thus, in sum, at the start of mobile m's downlink TBF, the actual power attenuation $\Delta^{(m)}_{RLC}$ is set to zero, unless there is previous power control state information for timeslot j cached, in which case the actual power attenuation is set to the previous power attenuation, reduced to account for elapsed time.

Caching Downlink Power Control State Information at the End of a Downlink TBF

FIG. 7 is a flow chart illustrating the caching of downlink power control state information at the end of a mobile station's downlink TBF. Referring now to FIG. 7, after the final Packet Downlink Ack/Nack message for a downlink TBF is received from mobile m (i.e., when the downlink TBF ends, on timeslot j, at time $n_{curr}$, function 701), $\Delta^{(m)}_{RLC}$ is updated. In an embodiment, $\Delta^{(m)}_{RLC}$, the mobile m's last Packet Downlink Ack/Nack message, and the timeslots the TBF used, are stored in the algorithm's cache, e.g. in memory 113, if the TBF ended normally (functions 703, 705, 707). These values may collectively be referred to as the downlink power control state vector. If the TBF ended abnormally, $\Delta^{(m)}_{RLC}$ is set to 0 before the mobile station m's downlink power control state vector is cached (functions 703, 704, 705, 707).

Selecting the Power Level Used to Transmit Downlink Blocks

Figure 8A:
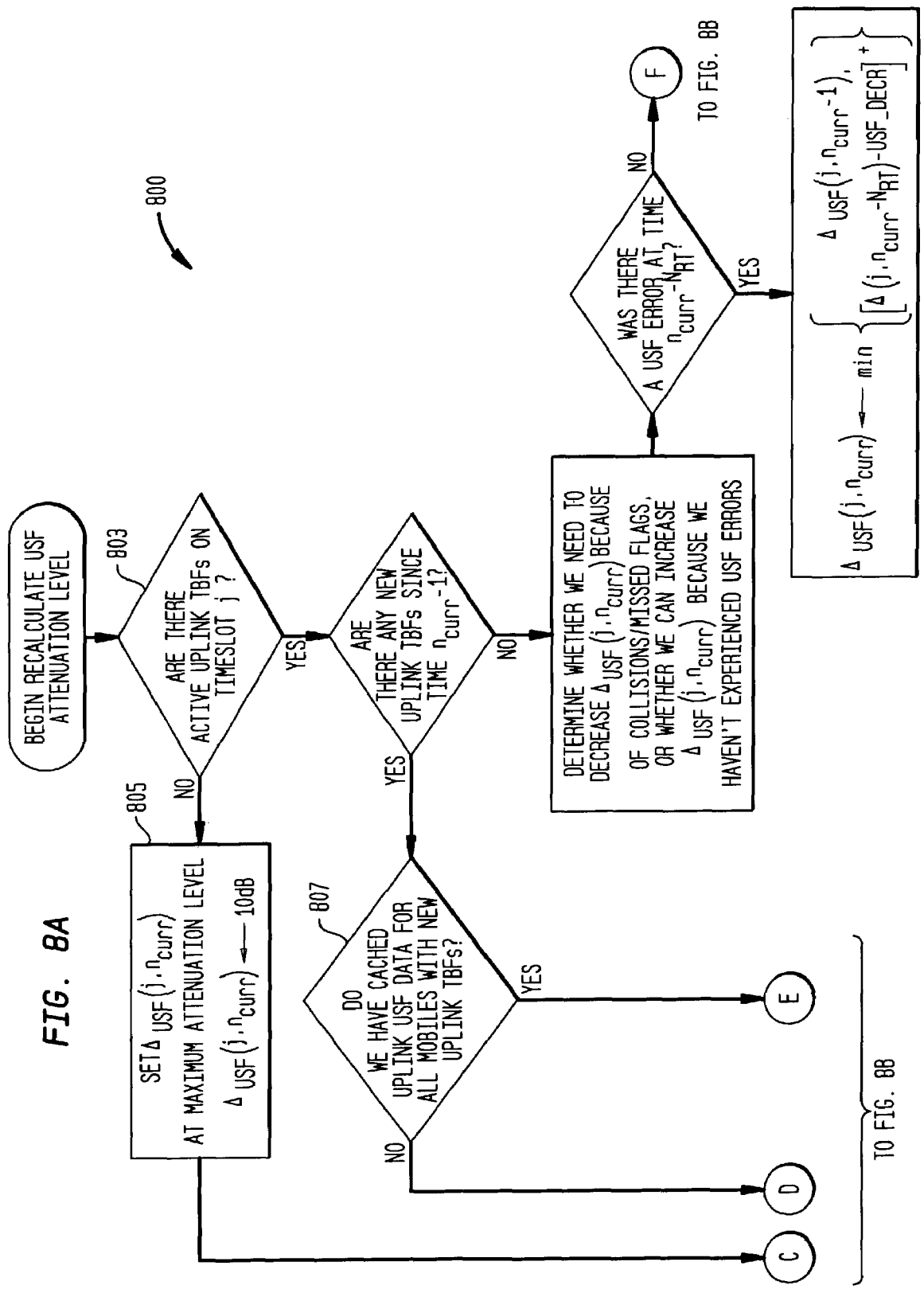

FIGS. 8A and 8B are a flow chart illustrating a method for updating the USF flag attenuation level before selecting a power level to transmit a downlink block at time n on timeslot j. Before selecting a power level to transmit a downlink block at time n on timeslot j, the downlink power control algorithm determines whether any adjustments to $\Delta_{USF}^{(j,n)}$ are needed.

Referring now to FIGS. 8A and 8B, there is shown a flow chart illustrating a method for updating the USF flag attenuation level $\Delta_{USF}^{(j,n)}$. The parameter $\Delta_{USF}^{(j,n)}$, an estimate of the maximum attenuation level which gives suitable USF flag performance for mobiles with uplink TBFs, must be adjusted to account for collisions/missed USF flags and new uplink TBFs on timeslot j. If there are no active uplink TBF's on timeslot j, then $\Delta_{USF}^{(j,n)}$ is set to the maximum possible attenuation level (e.g., 10 dB) (functions 803, 805).

In general, $\Delta_{USF}^{(j,n)}$ can be increased when suitably long periods of time pass during which no USF flag errors were observed, as illustrated in further detail in FIG. 8B. (functions 815, 821). Thus, for example, $\Delta_{USF}^{(j,n)}$ is incremented if, in a specified previous number of blocks, there have been no new uplink TBFs and no USF flag errors and no changes in the uplink control flag attenuation level (function 821) and, in an embodiment, if at least K blocks have been transmitted with $\Delta(j, \text{ncurr}) = \Delta_{USF}^{(j,n)}$.

Caching Uplink TBF Power Control History at the End of an Uplink TBF

Figure 9:
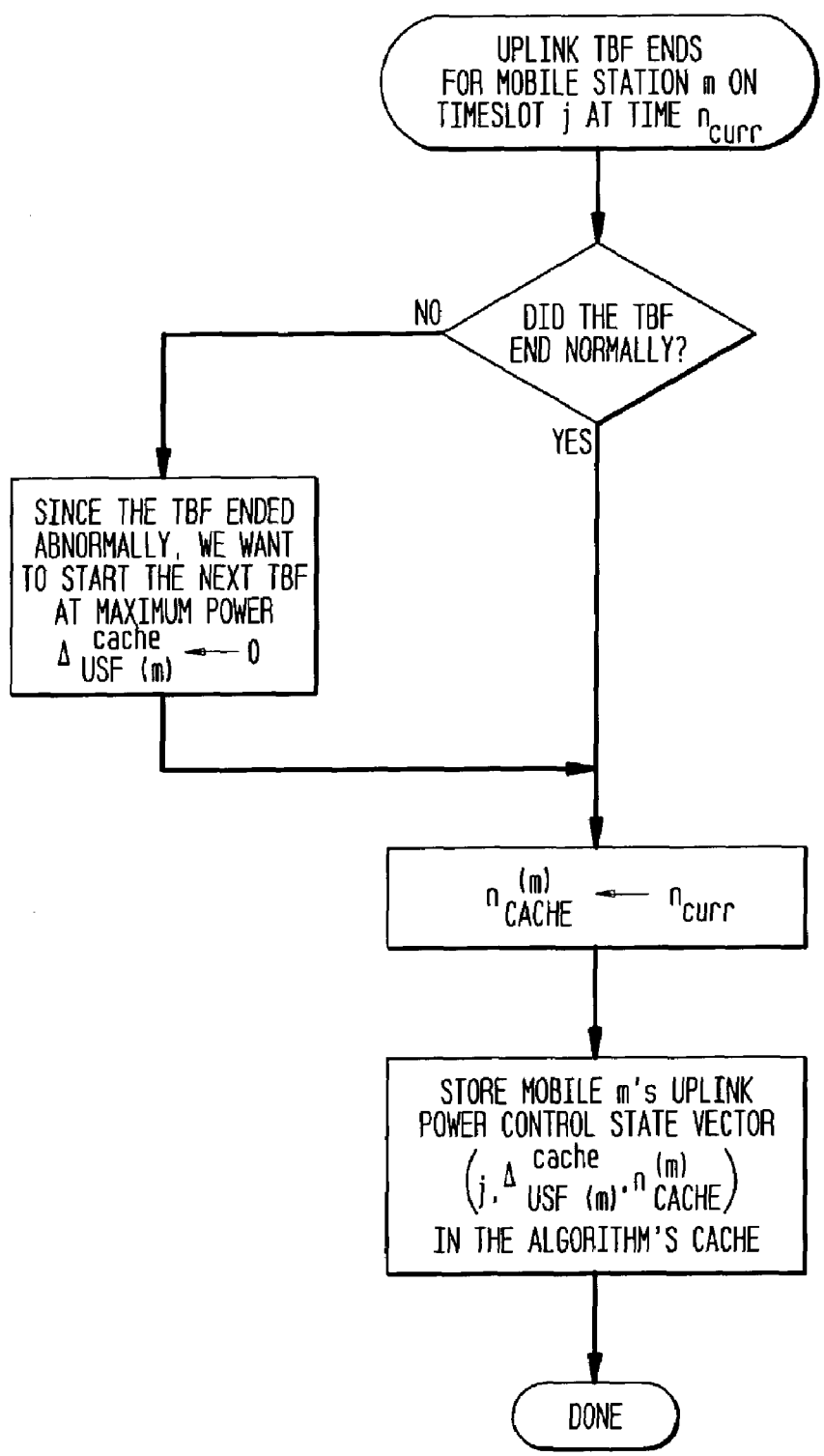
FIG. 9 is a flow chart illustrating the caching of USF flag performance history at the end of a mobile station's uplink TBF.

FIG. 9 is a flow chart illustrating the caching of USF flag performance history at the end of a mobile station's uplink TBF. Referring now to FIG. 9, for each timeslot used in an uplink TBF, the algorithm records the values of $\Delta_{USF}^{(j,n)}$, and the time the uplink TBF ended. These values may be cached in memory 113 by processor 111 running power control application 112, which implements the power control algorithm of the present invention. If subsequent uplink TBFs are initiated for the mobile, these cached values are used in the USF flag attenuation level update procedure, as shown in functions 807, 808 of FIGS. 8A and 8B.

Uplink Power Control

The exemplary embodiments of the present invention are further directed to a method for determining an uplink transmit power level at which each mobile station should transmit a current uplink data block over a radio link from the mobile to the base transmitter station. The method calculates a power control parameter in accordance with a modulation and coding scheme and in accordance with link quality measurements observed during a measurement interval. Based on the calculated power control parameter, the method determines the uplink transmit power level that the mobile should be using for the current uplink data block, and adjusts the transmit power level, if necessary, for the current uplink data block.

As previously discussed with respect to link adaptation and downlink power control, the uplink power control algorithm utilizes a caching and aging scheme to enable the algorithm to quickly reduce mobile transmit power when possible in an effort to effectively reduce interference in the network and extend mobile battery life. At the end of the uplink transmission flow between mobile station 16 and BTS 12, uplink power parameters and the modulation and coding scheme used for the uplink TBF is temporarily cached by the BTS 12 in memory 113, and is retrieved by the BTS 12 when a second uplink communication flow is being established with the mobile station 16. BTS 12 may adjust the retrieved uplink transmit power parameters using a compensation factor based on an amount of time between the end of the previous uplink communication flow and the start time of the current communication flow, and assign the compensated uplink transmit power parameters to the mobile. The compensation (aging) factor is used to increase mobile transmit power relative to its previous TBF. By using the uplink transmit power parameters of a mobile's previous TBF to determine the uplink power parameters to command the mobile in a subsequent TBF, mobile transmit power can be reduced.

Figure 10:
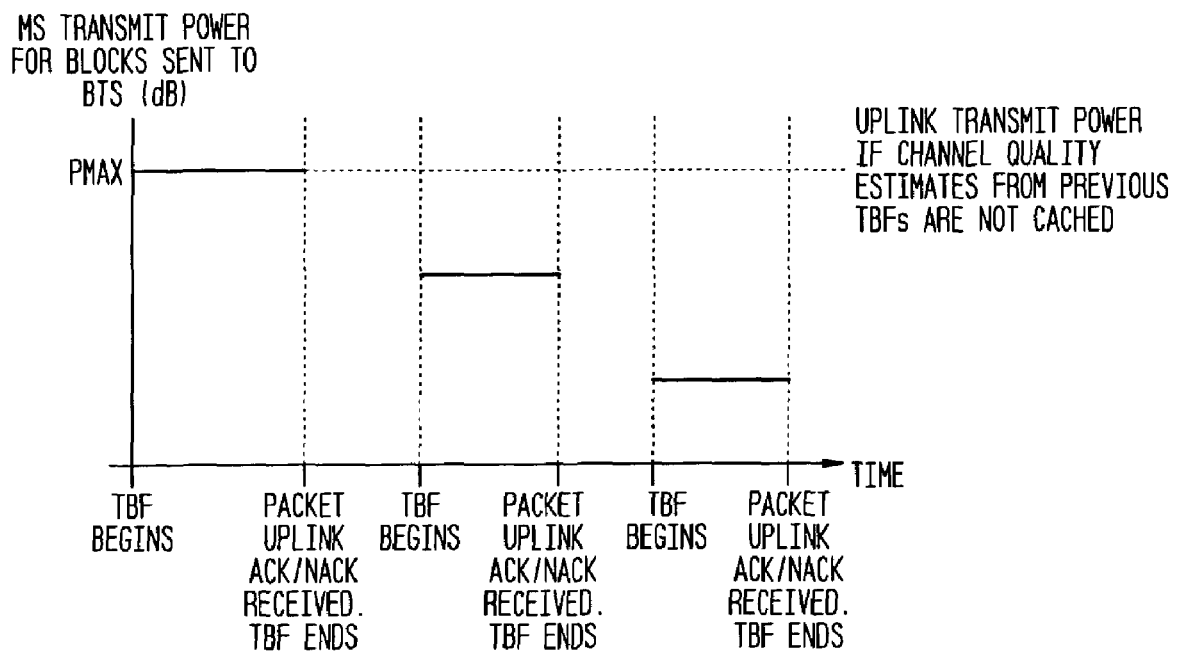
FIG. 10 is a graph illustrating additional reduction in transmit power level using a temporal correlation caching technique of the present invention.

FIG. 10 is a graph illustrating additional reduction in transmit power level using a temporal correlation caching technique for uplink power control in accordance with the present invention. In particular, FIG. 10 illustrates potential benefits of caching information on RF channel quality from one TBF to the next. Transmit power reduction may still be possible for users running bursty data applications. Path-loss, shadowing, and interference conditions in the cellular environment tend to be highly correlated over short periods of time (on the order of seconds) on the same carrier (TRX).

As a result of this high correlation, an uplink TBF for mobile station m beginning a short period of time after its previous uplink TBF on the same timeslot on the same TRX should experience similar airlink quality. Accordingly, and as illustrated with reference to FIG. 8, one feature of the uplink power control algorithm takes advantage of this correlation in order to provide potential reductions in transmit power.

At the end of each uplink TBF, the algorithm caches certain power control variables. When a subsequent uplink TBF is established for mobile station m in the same cell and TRX, the parameters and the time of the last update are retrieved from the algorithm's cache. The algorithm adjusts the parameters to account for the time that has elapsed since mobile station m's previous uplink TBF, and uses these adjusted values as initial values for the subsequent TBF. If a suitably long period of time has passed since the previous TBF, or if the previous TBF ended abnormally, the algorithm resets parameters to default values for the subsequent TBF.

Caching can also substantially improve the performance of link adaptation algorithms. Caching the coding scheme used when a TBF ends as well as the power control parameters can help determine a suitable choice for coding scheme to use at the start of subsequent TBFs.

While RF conditions on the same carrier (TRX) tend to show high levels of temporal correlation, RF conditions across TRXs will likely not show the same degree of correlation. Due to the realities of real-world RF planning, different TRXs in a cell may have different sets of co-channel neighbor cells. In addition, the number of timeslots in use at any time in interfering cells can differ widely across TRXs. The caching algorithm takes this into account. Hence, if a TBF for a mobile ends on one TRX, and a subsequent TBF begins on a different TRX, the transmit power used on the old TRX may or may not be sufficient for the new TRX. Hence it is necessary to cache the identity of the TRX used for a TBF.

Variables to help specify the uplink power control algorithm are summarized in Table 4. Table 5 summarizes some of the algorithm's tunable parameters. Since airlink performance differs between frequency-hopped and non-frequency hopped systems, the values of some of these tunable parameters may differ depending on whether frequency hopping is being used in the cell.

Additionally, the notation $[x]^+$ is used to denote a mapping of the real number x onto an integer in the set $\{\Gamma_{CH}^{min}, \Gamma_{CH}^{min}+2, \Gamma_{CH}^{min}+4, \ldots, \Gamma_{CH}^{max}\}$ nearest to x. Such a mapping used since mobile transmit power can only be controlled at a granularity of 2 dB, and since it is beneficial for the algorithm to limit the minimum and maximum transmit powers used by a mobile.

TABLE 4

Selected Variables used by the uplink power control algorithm

| Variable | Units | Definition |
|---|---|---|
| $\Gamma_{CH}^{m}(s)$ | dB | Value of $\Gamma_{CH}$ used for mobile m on time slot s. We shall drop the superscript, and write simply $\Gamma_{CH}$ (s), when the association of the value of $\Gamma_{CH}$ with mobile m on time slot s is clear from the context. |
| $\Gamma_{CH}^{INIT}(s)$ | dB | Initial value of $\Gamma_{CH}$ assigned to mobile m on time slot s in the assignment message |
| $\Gamma_{CH}^{min}$ | dB | Minimum value of $\Gamma_{CH}$ allowable in the cell; When $\alpha = 0$,. $\Gamma_{CH}^{min} = \Gamma_0 - PMAX$; if $\alpha > 0$, $\Gamma_{CH}^{min} = 0$. |
| $FN_{cache}^{m}$ | Frame number | Frame number when mobile m's last uplink TBF ended. |
| $FH\_TRX_{cache}^{m}$ | Unitless | Indicates whether mobile m's last uplink TBF was frequency hopping or not |
| $FHS\_id_{cache}^{m}$ | Unitless | FHS id of mobile m's last uplink TBF; applicable only if the last TBF was frequency hopping. |
| $TRX_{cache}^{m}$ | Unitless | If mobile m's last uplink TBF was not frequency hopping, then this variable indicates the TRX on which the TBF was active. Once again, $TRX_{cache}^{m}$ has no meaning if the last TBF was frequency hopping. |
| IM | dB | Interference margin. This represents the estimated difference in channel quality between a mobile's last active TBF and the current TBF. |

TABLE 5

Tunable parameters used by the uplink power control algorithm

| Algorithm tunable parameter | Units | Definition | Range |
|---|---|---|---|
| $K_{QA}$ | Unitless | If total number of block errors is greater than or equal to $K_{QA}$, then the ULPCA determines that a Quick ACK should be sent. | 1, 2, 3, . . . , 10 |
| $T_{cache}$ | Number of frames | Rate at which cached values of $\Gamma_{CH}^{m}$ are aged over time. (The caching feature can be turned OFF by setting $T_{cache} = 0$. Conversely, the caching feature is ON if $T_{cache} > 0$. | 0, 100, 150, 200, . . . , 1000 |
| Interference_Margin | dB | Interference Margin for non-frequency hopped TRX or cell. For non-frequency hopped TRXs or cells, if the TBF is established on a TRX different from the one to which it was established earlier, then it may be necessary to assign an initial power which is Interference_Margin dB higher. This margin accounts for potential quality or interference differences between TRXs. | 0, 2, . . . , 10 |
| Interference_Margin_FH | dB | Interference Margin for frequency hopped TRX or cell. For frequency hopped TRXs or cells, if the TBF is established with an FHS id different from the one with which it was established earlier, then it will be assigned an initial power Interference_Margin_FH dB higher. This margin accounts for potential quality differences between FHS ids. (Interference_Margin_FH $\geq$ 0) | 0, 2, . . . , 10 |

Figure 11:
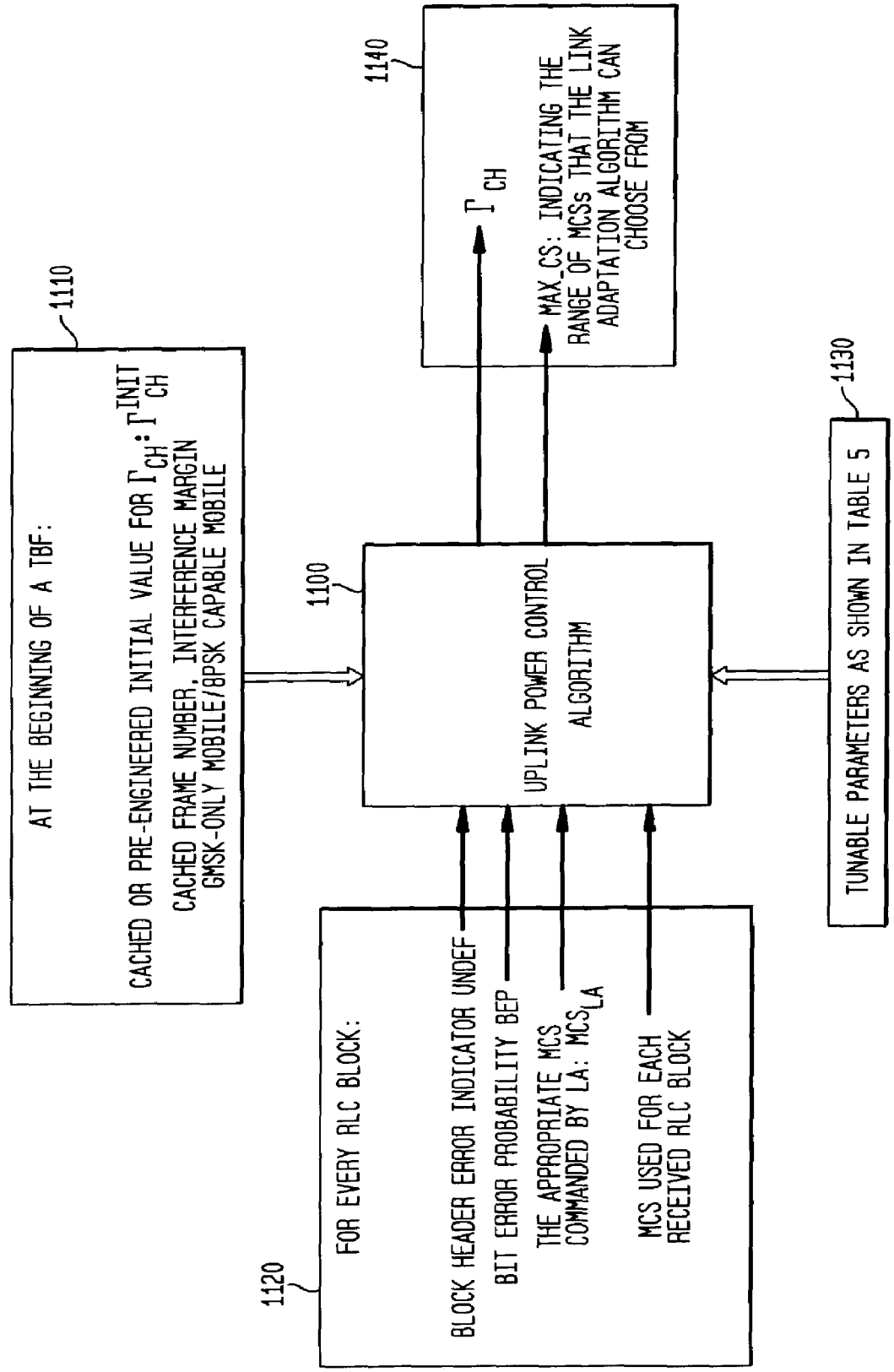
FIG. 11 illustrates input and output parameters in accordance with the uplink power control algorithm of the invention.

FIG. 11 illustrates input and output parameters in accordance with the uplink power control algorithm of the invention. As can be seen in FIG. 11, the uplink power control algorithm (ULPCA) 1100 receives inputs from blocks 1110, 1120 and 1130. At the beginning of each TBF, the ULPCA 1100 receives an initial value for the power control parameter $\Gamma_{CH}$, together with the cached frame number $FN^{m}_{cache}$ and interference margin IM. For every RLC block, the ULPCA receives, as inputs from block 1120, an undefined block header error identifier, the BEP for each RLC block, the MCS commanded by LA (the link adaptation algorithm described above) and the MCS used for each RLC block. Additionally, the ULPCA 1100 receives the tunable parameters outlined in Table 3 as inputs from a block 1130. From these inputs, the ULPCA 1100 calculates a revised or updated power control parameter $\Gamma_{CH}$ and the MAX_MCS parameter, which is the modulation and coding scheme indicating the range of MCSs that the link adaptation algorithm may choose from, based on the various modulation and coding scheme inputs and link quality measurements received from blocks 1110, 1120 and 1130.

Finite State Machine Implementing the ULPCA

One finite state machine is associated with each mobile station 16 with an active uplink TBF. For reasons of efficiency, the algorithm is driven solely by external events: start of a TBF, receipt of an uplink block, transmission of a packet uplink ACK/NACK message, transmission TBF reassignment message, or termination of a TBF. No timers are employed.

A Quick Ack feature is implemented in an effort to improve the transient performance of the power control algorithm. For example, in situation where initial transmit power $P_O$ is much less than target mobile transmit power $P_T$, then block errors are very likely. Accordingly, the received quality of individual RLC blocks is assessed by the rPCU (i.e., CPU 111 and its power control application 112) in the BTS 12, and if the quality is very poor within a first polling interval, the BTS 12 sends a Quick ACK UL ACK/NACK message with a new value of $\Gamma_{CH}$, a message commanding a higher target mobile transmit power $P_T$ from the mobile station 16.

Accordingly, the algorithm employs one flag to control use of the Quick Ack feature. When set to "1", indicates that the Quick ACK feature is active. During this period, the uplink power control algorithm (ULPCA) closely monitors the quality of the first several uplink blocks sent on the TBF to determine if the initial uplink transmit power level commanded by the rPCU at the start of the TBF is too low. When set to "0", the flag indicates that the Quick ACK feature has been disabled by the uplink power control algorithm.

Figure 12:
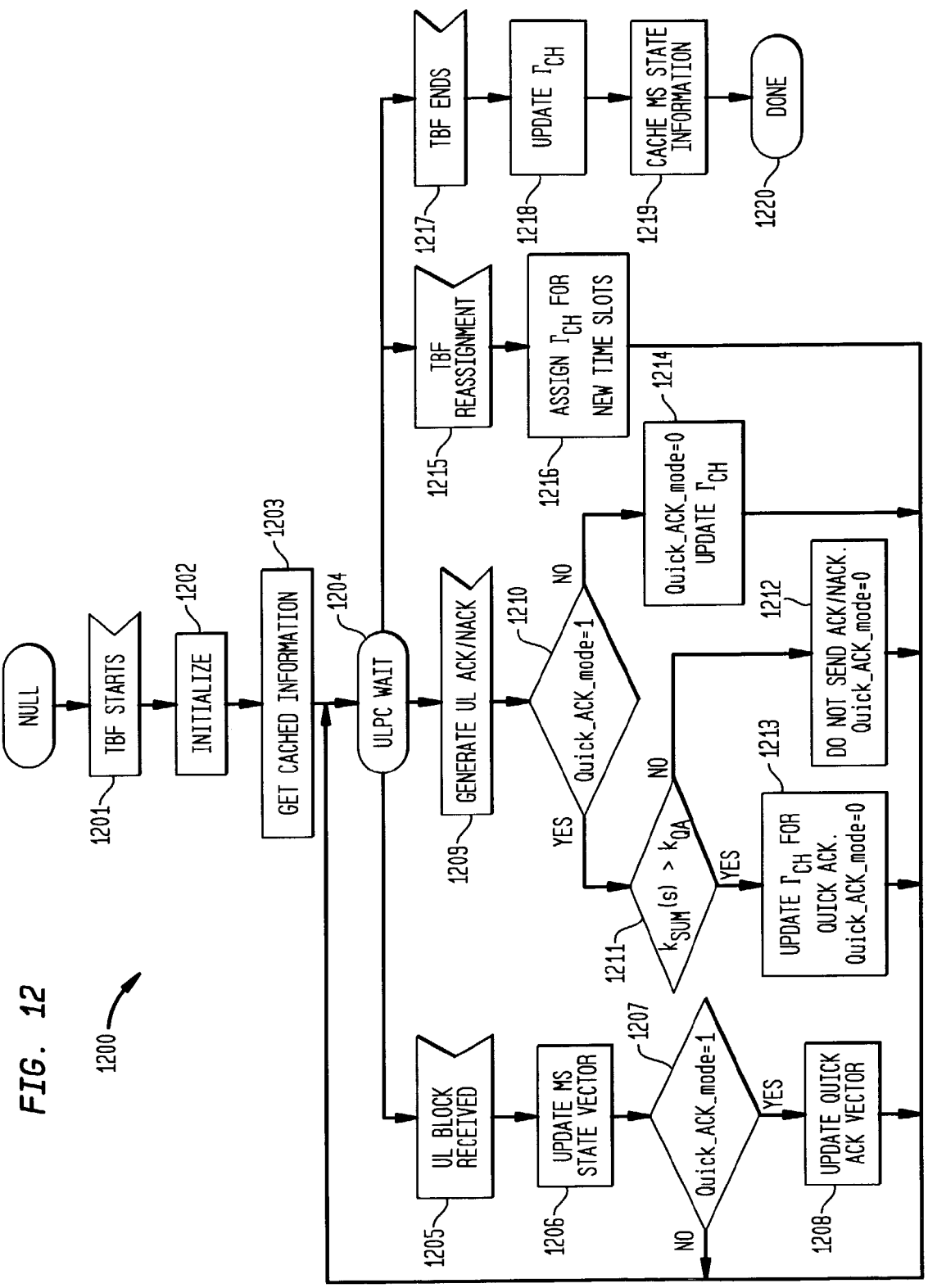
FIG. 12 is a flow chart illustrating an uplink power control finite state machine and method in accordance with the invention.

FIG. 12 is a flow chart illustrating an uplink power control method in accordance with the invention. Referring to FIG. 12, there is illustrated a flowchart outlining an uplink power control method 1200. Additionally with respect to FIG. 12, there is provided a Table 6 below with explanations of the variables used, for ease of understanding. At function 1201, an uplink TBF begins for a mobile station 16. At function 1202, counters and other variables used by the uplink power control algorithm for this TBF are initialized. These are illustrated in the following Table 7.

TABLE 6

Initialization of variables at the start of an uplink TBF

For each time slot s, set
$BEP(s) = 0$
$N_{tot} = k_{tot} = 0$
$\Delta_\Gamma(s) = 0$
$FN_0(s) = FN_{new}(s) = FN_c$
$Quick\_ACK\_mode = 1$
$MCS_{LA} = 2$
$MAX\_MCS = 2$

TABLE 7

Brief Explanation of Variables Used in ULPCA
Explanation of variables used:

| | |
|---|---|
| $S^m =$ | set of time slots being used by UL TBF; note that $S^m$ has only one element if TBF is single-slot. |
| $S_{old}{}^m:$ | this relates to TBF reassignment. We use $S_{old}{}^m$ to denote the set of time slots which were being used by the TBF before reassignment. |
| $N_{tot}:$ | used in Quick ACK mode; denotes the total number of RLC blocks received since the TBF was established. |
| $k_{tot}:$ | also used in Quick ACK mode; denotes the total number of RLC blocks out of $N_{tot}$ which were received incorrectly. |
| $FN_{new}(s) =$ | all UL RLC blocks received on time slot s after $FN_{new}(s)$ are assumed to have been transmitted using the updated value of $\Gamma_{CH}(s)$. |
| Quick_ACK_mode: | when set, it denotes that the ULPCA is in the Quick ACK mode. |
| $MCS_{LA}:$ | set to be 2 at the beginning of a TBF. will be the output of the link adaptation algorithm to be used by the power control algorithm during the transmission of a TBF. |
| MAX_MCS: | set to be 2 at the beginning of a TBF. will be the output of the power control algorithm to be used by the link adaptation algorithm. |

At function 1203, and if the algorithm's caching feature is implemented, the algorithm checks whether there was a recent uplink TBF for this mobile in this cell. If caching is enabled, the initial assignment of $\Gamma_{CH}$ values on each timeslot is based on the values of $\Gamma_{CH}$ used for the mobile's previous uplink TBF, the TRX on which the TBF is established, and the amount of time that has elapsed since the previous TBF. If caching is not implemented, the TBF is assigned a default value of $\Gamma_{CH}$ on each timeslot. This default value is engineered so that the majority of mobile stations in the cell starting an uplink TBF will experience acceptable uplink channel quality.

At function 1204, the uplink power control algorithm waits for an event to occur. Next, an uplink block that was allocated to the mobile is received from the BTS, at function 1205. Thereafter, counters used to track the performance of uplink channel are updated at function 1206 in response to parameters in the PCU frame header of the received block. This update function keeps a tally of the number of errored blocks since the start of an measurement interval, the observed bit error rate, and other counters used to assess the quality of the link.

The Quick ACK feature is disabled, if the Quick_Ack_mode=0 (function 1207). The feature is disabled after the Quick ACK UL ACK/NACK message is scheduled to be sent to the mobile since the start of the TBF. If the Quick_Ack_mode=1, the Quick ACK feature remains active (and counters and other parameters used by the Quick ACK algorithm are updated (function 1208) based on the fields contained in the received block's PCU frame header.

Referring back to the wait period at function 1204, an uplink ACK/NACK is also generated by the rPCU at function 1209. Here the power control algorithm determines the values of $\Gamma_{CH}$ that need to be included in the message. Since the power levels determined by the power control algorithm are time-sensitive, they should be calculated at the last possible instant before the block leaves the rPCU. The rPCU is scheduling this ACK/NACK message as a Quick ACK in function 1210. The ULPCA finally determines whether it is necessary to send the Quick ACK or not by determining whether the total number of block errors $k_{SUM}(s)$ is greater than or equal to tunable parameter $k_{QA}$ (function 1211) If not, the ULPCA determines that the channel conditions are acceptable, and it is not necessary to send a Quick ACK. Quick_ACK_mode is set to 0 (function 1212), thereby disabling the Quick ACK feature.

Back at function 1211, if at the beginning of an uplink TBF, and the ULPCA has determined that the C/I levels for the uplink transmit power used by the MS is too low, a Quick ACK should be sent to the mobile. Since not enough blocks have been received in order to base the power control update using the accurate "update rCH" procedure, the values of $\Gamma_{CH}$ will instead be updated (function 1213) based on a crude "Update $\Gamma_{CH}$ for Quick ACK" procedure. Values of $\Gamma_{CH}$ to be included in the ACK/NACK message are determined using the "Update $\Gamma_{CH}$ for Quick ACK" procedure. Quick_ACK_mode is set to 0.

Back at function 1210, if it is determined that Quick_Ack_mode=0, the ACK/NACK is not a Quick ACK. The Quick_ACK_mode flag is set to 0, disabling the Quick-ACK feature. The values of $\Gamma_{CH}$ to include in the ACK/NACK message are calculated using the "update $\Gamma_{CH}$" procedure which adapts the uplink power control parameter $\Gamma_{CH}$ based on the quality of the uplink blocks received over the measurement interval.

At function 1215, the set of timeslots allocated to the mobile station changes. Values of $\Gamma_{CH}$ need to be determined for the new timeslots, and counters used to track the quality of the new timeslots need to be initialized. Values of $\Gamma_{CH}$ for the new timeslots are determined (function 1216) and included in the assignment message. Counters used to track the quality of the new timeslots are initialized. At function 1217, the uplink TBF for the mobile ends. The values of $\Gamma_{CH}$ on each timeslot are updated (function 1218) based on the quality of the uplink packets received since the start of the measurement interval. Thereafter, the current frame number and transmit power level are cached at function 1219 if the caching feature is implemented, and the algorithm terminates (function 1220).

Get Cached information Procedure (Function 1203)

In the case when the mobile does not have any cached information, or when the caching feature is turned OFF, the initial value of $\Gamma_{CH}(s)$ is set to $\Gamma^D_{CH}$. If, however, some cached information is indeed available, then the initial value of $\Gamma_{CH}(s)$ is set to the cached value of $\Gamma_{CH}(s)$, aged by an amount proportional to the elapsed time between the previous TBF and the current one. If necessary, an interference margin may be introduced, which accounts for any anticipated difference between the channel quality for the previous TBF and the current one.

First, a case when no interference margin is necessary is analyzed. Here, when an uplink TBF is re-established for mobile m, the value of $\Gamma^{INIT}_{CH}(s)$ is selected from the cached information as indicated in expression (3). For each timeslot on which the TBF is established, set $$\Gamma_{CH}^{INIT}(s) = \quad (3)$$

$$\begin{cases} \max\left(\Gamma_{CH}^{D}, \left[\Gamma_{cache}^{m} - 2\frac{FN_c - FN_{cache}^m}{T_{cache}}\right]^+\right), & \text{if } \Gamma_{cache}^{m}(s) \geq \Gamma_{CH}^{D} \\ \Gamma_{cache}^{m}, & \text{otherwise.} \end{cases}$$

Expression (3) may be explained as follows. If $\Gamma_{cache}^{m}(s) \geq \Gamma_{CH}^{D}$, then the mobile is experiencing good channel conditions. However, this may change with time. So, the cached information is aged. The term $2((FN_C - FN_{cache}^{m})/T_{cache})$ serves as the aging factor; the numerator represents the time elapsed since the last uplink TBF for the mobile was torn down, while the denominator equals the amount of elapsed time which would trigger a 2 dB increase in power. For example, if $T_{cache}=100$, then $$\Gamma_{CH}^{INIT}(s) = \begin{cases} \Gamma_{cache}^{m}, & \text{if } FN_c - FN_{cache}^m < 50, \\ \Gamma_{cache}^{m} - 2, & \text{if } 75 \leq FN_c - FN_{cache}^m < 150, \\ \Gamma_{cache}^{m} - 4, & \text{if } 175 \leq FN_c - FN_{cache}^m < 250, \text{ etc.} \end{cases} \quad (4)$$

If on the other hand, $\Gamma_{cache}^{m} < \Gamma_{CH}^{D}$, then the mobile is experiencing harsh channel conditions. Accordingly, set $\Gamma_{CH}^{INIT}(s) = \Gamma_{cache}^{m}$. The information is not aged here, because $\Gamma_{CH}^{D}$ is chosen such that $\Gamma_{CH}^{INIT}(S) < \Gamma_{CH}^{D}$ with very low probability. So, in this case, with very high probability, the mobile is going to experience better channel conditions after some time. Therefore, setting $\Gamma_{INIT_{CH}}(s) = \Gamma_{cache}^{m}$ will ensure good airlink performance for uplink UL TBF with very high probability.

Figure 13A:
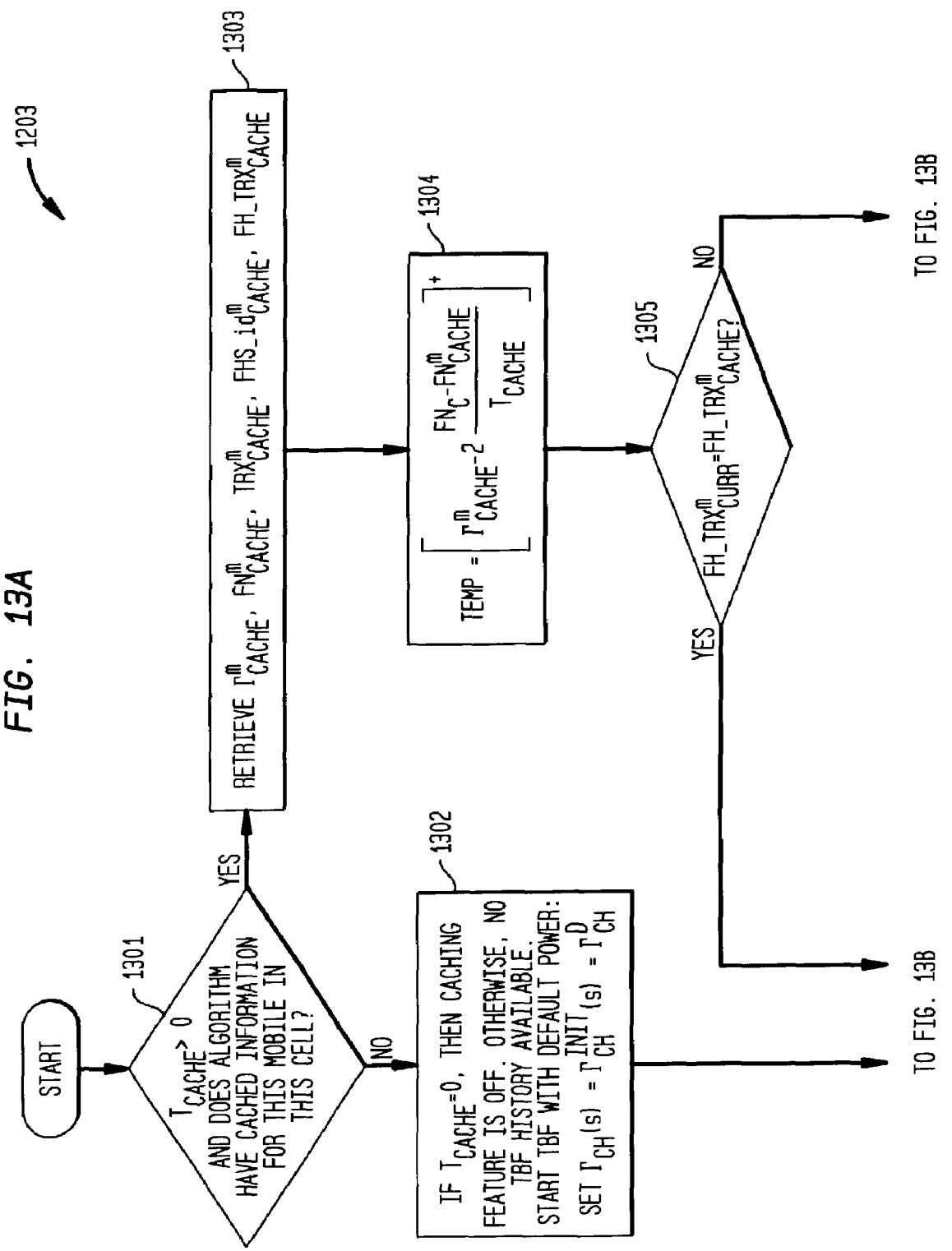
FIGS. 13A and 13B is a flow chart illustrating how initial mobile transmit power is determined according to the invention.
Figure 13B:
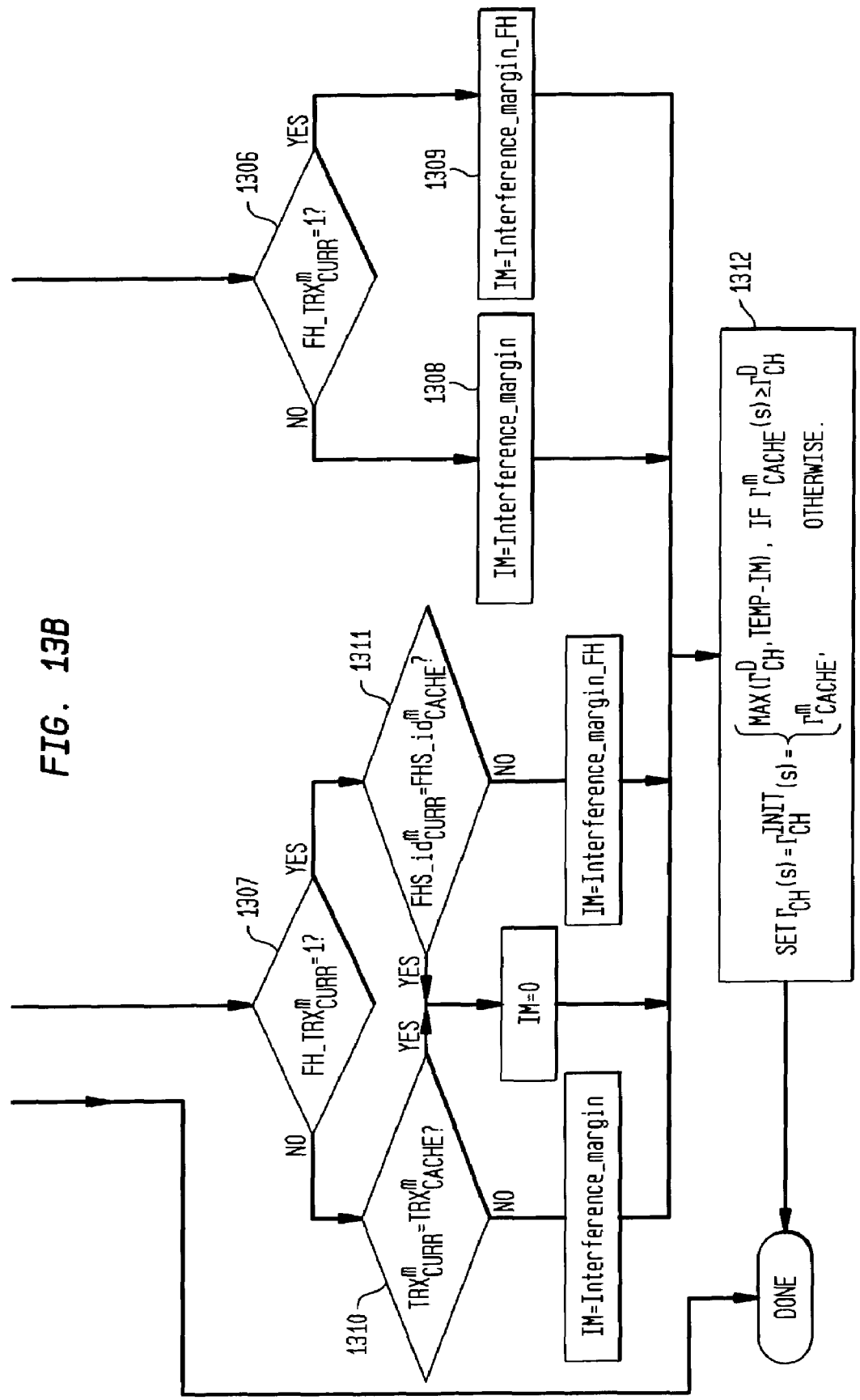

FIGS. 13A and 13B is a flow chart illustrating how initial mobile transmit power is determined according to the invention, and more particularly is provided to describe the "Get cached information" procedure 1203 in further detail. Initially, at function 1301, since no TBF history is initially available or the caching feature is OFF for this mobile in this cell, the mobile station is commanded to use a default transmission power level at function 1302, which is determined by the tunable parameter $\Gamma_{CH}^{D}$. If, however, in the recent past, this mobile station has had an uplink TBF in this cell, the algorithm retrieves the cached power level (function 1303) as well as the time (frame number) at which the previous TBF ended, an indication of whether the previous TBF was frequency hopping or not ($FH\_TRX_{cache}^{m}$), the TRX on which the previous TBF was active ($TRX_{cache}^{m}$) and the FHS id for the mobile ($FHS\_id_{cache}^{m}$). Note that $TRX_{cache}^{m}$ is meaningful only if the previous TBF was non-frequency hopping, while $FHS\_id_{cache}^{m}$ is meaningful only if the previous TBF was frequency hopping.

At function 1304, TEMP is set to the following expression (5):

$$TEMP = \left[\Gamma_{cache}^{m} - 2\frac{FN_c - FN_{cache}^m}{T_{cache}}\right]^+. \quad (5)$$

This is done for the sake of convenience. Next, it is checked whether the current TBF that is frequency hopping for the mobile station and the previous TBF that was frequency hopping are equal at function 1305. Specifically both the previous and current TBFs are evaluated, at function 1306 and 1307. If the result at function 1306 is NO, the previous TBF was not frequency hopping, but the current one is. So, the Interference_Margin FH, (IM) is set (function 1308), i.e., set IM to be Interference_Margin_FH. If the result at function 1306 is YES, the previous TBF was frequency hopping, but the current one is not. Thus, the margin is set to be Interference_Margin (IM).

Similarly, if the result of function 1307 is NO, the previous TBF was not frequency hopping and neither is the current one. Thus, it is evaluated whether the TBFs are on the same carrier (function 1310). If the TRXs are the same, i.e., if $TRX_{curr}^{m} = TRX_{cache}^{m}$, then IM=0, i.e., no margin is necessary; else, set IM=Interference_Margin. Further, if the result at function 1307 is YES, the previous TBF was frequency hopping and so is the current one. Thus, the FHS ids are checked (function 1311) to see if they are the same, i.e., if $FHS\_id_{curr}^{m} = FHS\_id_{cache}^{m}$. If they are the same, then IM=0, no margin is necessary; else, set IM=Interference_Margin_FH. Finally, at function 1312, the interference margin is introduced, and $\Gamma_{CH}^{INIT}(s)$ is calculated.

Cache MS State Information Procedure (Function 1219)

FIG. 14 depicts a flow chart to illustrate caching information on the power levels used for a mobile's uplink TBF when the TBF ends, according to the invention. As discussed above, caching provides a simple and effective tool for improving the performance of the uplink power control algorithm for short-lived uplink TBFs. At the end of each uplink TBF, the algorithm stores some key power control state information for each mobile m. This information can be used to select $\Gamma_{CH}^{INIT}(s)$ more accurately at the start of the next uplink TBF for the mobile.

As shown in FIG. 14, it is initially determined whether the TBF ended normally in function 1401. If so, then it is next determined (function 1402) whether the current TBF is frequency hopping. If so, then in a function 1403, the algorithm determines the smallest value of $\Gamma_{CH}$ (equivalently, the highest uplink transmit power used) over all uplink timeslots "s" assigned to the mobile. Since the TBF ended normally, this transmit power level gives an excellent indication of the power level a mobile should use if another uplink TBF for this mobile begins in the near future. Since the current TBF is frequency hopping, set $FH\_TRX_{cache}^{m}=1$, and cache the FHS id. The TRX on which the TBF exists is irrelevant; thus $TRX_{cache}^{m}$ is set to −1 to indicate this condition. This function also conserves the time at which these estimates were made ($FN_{cache}^{m}$).

If the current TBF is not frequency hopping, the algorithm at function 1404 determines the smallest value of $\Gamma_{CH}$ (equivalently, the highest uplink transmit power used) over all uplink timeslots s assigned to the mobile. As the TBF ended normally, this transmit power level gives an excellent indication of the power level a mobile should use if another uplink TBF for this mobile begins in the near future. Since the current TBF is not frequency hopping, set $FH\_TRX_{cache}^{m}=0$, and cache the TRX on which the TBF exists. The FHS id is non-existent; thus $FHS\_id_{cache}^{m}$ is set to −1 to indicate this condition.

If the TBF did not end normally, the procedure moves to function 1405. Since the TBF ended abnormally, it is very likely that the uplink transmit power used by the mobile was too low. The algorithm disregards the current values of $\Gamma_{CH}$ assigned to the mobile. Should another uplink TBF for mobile m begin in the near future, the mobile should use the default maximum transmit power (the transmit power corresponding to $\Gamma_{CH}^{min}$. Finally, outputs from either of functions 1403 or 1405, the mobile's state vector, is cached at a function 1406.

While the previous discussion has been directed to exemplary embodiments in which control of the network transmission parameters used by a mobile system is dictated by the network (as in GPRS and EGPRS networks), it may advantageous for other mobile telecommunications systems to allow mobile systems to control their own transmission parameters, with minimal or no direct control from the network. Such an approach is advantageous in that it can reduce the complexity of the network. In such systems, the caching and aging described above would be performed by the mobile station itself.

For example, and referring to FIG. 1, the mobile station would be configured to have an RF transceiver, CPU and memory, as described with BTS 12. The caching and aging functions would reside in the MS CPU, and data would be cached in the MS memory. Further link adaptation in the uplink and uplink power control employing the caching and aging as described above could be implemented at the mobile station.

The exemplary embodiments of the present invention being thus described, it will be obvious that the same may be varied in many ways. Such variations are not to be regarded as departure from the spirit and scope of the exemplary embodiments of the present invention, and all such modifications as would be obvious to one skilled in the art are intended to be included within the scope of the following claims.

What is claimed is:

1. A method of controlling link transmission parameters of a communication flow in a network, comprising:
   compensating link quality indicators;
   selecting a modulation and coding scheme (MCS) using the compensated link quality indicators;
   caching one or more network parameters at the end of a first communication flow, the network parameters including the link quality indicators, the selected MCS, and at least one parameter based on an estimated additional downlink attenuation necessary for a mobile unit to achieve a given level of performance; and
   adjusting the network parameters for controlling at least one of a link quality and a transmit power of a next communication flow based on an uncertainty caused by an elapsed time between the first and next communication flows, wherein
   the adjusting includes:
   retrieving the cached MCS and the cached link quality indicators when the next communication flow is being established; and
   determining an initial MCS to be used for the next communication flow based on the retrieved MCS and the retrieved compensated link quality indicators, the compensating being based on the elapsed time.

2. The method of claim 1, further comprising:
   receiving at least one of the network parameters during the first communication flow, the at least one network parameter calculated in accordance with a selected modulation and coding scheme, and in accordance with link quality measurements observed during a measurement interval, wherein the at least one network parameter is cached in accordance with the caching and adjusted in accordance with the adjusting; and
   determining base station transmit power to use in transmitting a downlink data block in the next communication flow based on the at least one adjusted network parameter.

3. The method of claim 2, wherein the at least one network parameter is one of a radio link attenuation level parameter and an uplink control flag attenuation level parameter for a mobile station.

4. The method of claim 3, wherein
   the radio link attenuation level is the downlink attenuation that the mobile station can tolerate while still achieving acceptable error rate; and
   the uplink control flag attenuation level indicates the estimated additional dowulink attenuation that can be applied such that adequate uplink state flag (USF) performance is achieved.

5. The method of claim 3, wherein the determining includes determining a transmit power attenuation level for transmitting the current downlink data block from a minimum of the radio link attenuation level and the uplink control flag.

6. The method of claim 2, wherein
   the caching includes caching, at the end of a downlink temporary block flow (TBF) for a mobile station, the radio link attenuation level and time that the radio link attenuation level was last updated; and
   the adjusting includes:
   retrieving, at the beginning of a next downlink TBF for the mobile station, the cached radio link attenuation level and time that the radio link attenuation level was last updated,
   decreasing the cached radio link attenuation level to account for the elapsed time; and
   setting an initial radio link attenuation level for the next downlink TBF in accordance with the cached radio link attenuation level.

7. The method of claim 1, further comprising:
   receiving at least one of the network parameters during the first communication flow, the at least one network parameter calculated in accordance with link quality measurements observed during a measurement interval and a selected modulation and coding scheme, wherein the at least one network parameter is cached in accordance with the caching and adjusted in accordance with the adjusting; and
   determining mobile station transmit power to use in transmitting an uplink data block in the next communication flow based on the at least one adjusted network parameter.

8. The method of claim 7, wherein the at least one network parameter is a power control parameter.

9. The method of claim 7, wherein
   the caching includes caching, at an end of a first uplink communication flow with a mobile station, the selected modulation and coding scheme, and
   the adjusting includes:
   retrieving the cached modulation and coding scheme when a second uplink communication flow is being established with the mobile station; and
   changing the retrieved modulation and coding scheme to a stronger modulation and coding scheme based on the elapsed time.

10. A method of adaptively selecting an airlink coding scheme in a network, comprising:
    determining a coding scheme operating region based on a currently used coding scheme and measurements representative of a block error rate;
    selecting a coding scheme based on the determined coding scheme operating region;
    caching, at an end of a first downlink communication flow with a mobile station, the selected coding scheme;

retrieving the cached coding scheme when a next downlink communication flow is being established with the mobile station; and changing the cached coding scheme to a stronger coding scheme based on a elapsed time between the end of the first downlink communication flow and the beginning of the next downlink communication flow.

11. A method of determining an airlink modulation and coding scheme (MCS), comprising:

compensating at least one link quality indicator;

selecting a MCS based on the compensated link quality indicators;

caching, at the end of a first communication flow, the selected MCS and the link quality indicators; and determining an initial MCS to be used for a next communication flow based on the cached MCS and on the compensated link quality indicators, wherein the compensating is based on an amount of time between the end of the first communication flow and the beginning of the next communication flow.

12. A method for determining a transmit power level at which a network transmits a current block in the downlink, comprising:

compensating link quality indicators;

selecting a modulation and coding scheme (MCS) using the compensated link quality indicators;

receiving one or more network parameters in a first communication flow from a mobile station;

caching the network parameters at the end of a first communication flow for a elapsed time;

adjusting the network parameters for a next communication flow based on an uncertainty caused by caching for the elapsed time; wherein the adjusting includes:

retrieving the cached MCS and the cached link quality indicators when the next communication flow is being established;

determining an initial MCS to be used for the next communication flow based on the retrieved MCS and the retrieved compensated link quality indicators, the compensating being based on the elapsed time; and determining a transmit power attenuation level for transmitting the current block in the next communication flow based on the adjusted network parameters.

13. The method of claim 12, wherein the one or more network parameters is a quality measurement from the mobile station indicating an average radio link quality over a previous group of blocks.

14. The method of claim 13, wherein at least one of the group of blocks was transmitted at a different power level.

15. A method of determining an airlink modulation and coding scheme (MCS) for uplink transmissions, comprising:

compensating at least one first MCS link quality indicator;

reading a first MCS from a table using the compensated link quality indicator;

caching, at an end of a first downlink communication flow, the read MCS and the link quality indicator;

retrieving the cached first MCS and the cached link quality indicator when a second communication flow is being established; and determining a second MCS to be used for the second communication flow based on the retrieved first MCS, the retrieved link quality indicator, and an amount of time between the end of the first communication flow and the beginning of the second communication flow.

16. The method of claim 15, further comprising:

changing the first MCS based on power control being performed by a power control algorithm.

17. The method of claim 15, wherein the link quality indicators include bit error probability.

18. The method of claim 15, wherein the link quality indicators include bit error probability (BEP) and a coefficient of variation of the BEP.

19. The method of claim 15, wherein the first MCS is GMSK and the second MCS is 8PSK.

* * * * *